(12) United States Patent
Ichikawa

(10) Patent No.: US 11,652,953 B2
(45) Date of Patent: May 16, 2023

(54) VIDEO SIGNAL PROCESSING DEVICE, VIDEO FREEZE DETECTION CIRCUIT AND VIDEO FREEZE DETECTION METHOD

(71) Applicant: LAPIS Semiconductor Co., Ltd., Yokohama (JP)

(72) Inventor: Tomoyuki Ichikawa, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 17/152,299

(22) Filed: Jan. 19, 2021

(65) Prior Publication Data
US 2021/0144362 A1 May 13, 2021

(30) Foreign Application Priority Data

Jan. 30, 2019 (JP) .............................. JP2019-014013
Jan. 28, 2020 (JP) .............................. JP2020-011750

(51) Int. Cl.
*H04N 17/00* (2006.01)
*H04N 5/14* (2006.01)
*G06F 11/10* (2006.01)
*G06V 20/40* (2022.01)

(52) U.S. Cl.
CPC ......... *H04N 5/147* (2013.01); *G06F 11/1004* (2013.01); *G06V 20/48* (2022.01); *G06V 20/49* (2022.01); *H04N 17/002* (2013.01)

(58) Field of Classification Search
CPC .......... H04N 5/14; H04N 5/147; H04N 17/00; H04N 17/002; H04N 9/64; G06V 20/49; G06V 20/48; G06F 11/1004

USPC .................................................. 348/180, 700
See application file for complete search history.

(56) References Cited

U.S. PATENT DOCUMENTS

| | | | | |
|---|---|---|---|---|
| 9,641,809 B2 * | 5/2017 | Staudenmaier | ........ | H04N 7/183 |
| 9,836,832 B2 * | 12/2017 | Wu | ........................ | G06T 7/254 |
| 10,116,909 B2 * | 10/2018 | Gifford | ................ | G11B 27/031 |
| 2002/0196373 A1 * | 12/2002 | Szybiak | ................ | H04N 5/144 |
| | | | | 348/700 |
| 2009/0147861 A1 * | 6/2009 | Schnebly | ................ | H04N 7/183 |
| | | | | 375/240.27 |

FOREIGN PATENT DOCUMENTS

JP 2018-079839 A 5/2018

* cited by examiner

*Primary Examiner* — Trang U Tran
(74) *Attorney, Agent, or Firm* — Rabin & Berdo, P.C.

(57) ABSTRACT

A video signal processing device includes: a video signal dividing unit configured to divide a video signal into first to k-th (k is an integer of 2 or greater) partial video signals for each frame; a video change detection unit configured to determine, for each of the first to k-th partial video signals, whether or not a video based on the partial video signals has changed between respective frames, and generate first to k-th video change detection signals representing the respective detection results; and a video sameness determination unit configured to generate a video sameness signal indicating that the video signal has not changed, if the number of video change detection signals that indicate the video has not changed, among the first to k-th video change detection signals, is greater than a prescribed number.

8 Claims, 18 Drawing Sheets

FIG. 4

| | PD1 | PD2 | PD3 | PD4 | PD5 | PD6 | ...... | PD(n) | |
|---|---|---|---|---|---|---|---|---|---|
| | R7 | G0 | B7 | R0 | G7 | B0 | | R7 | ~SP1 |
| | R6 | G1 | B6 | R1 | G6 | B1 | | R6 | ~SP2 |
| | R5 | G2 | B5 | R2 | G5 | B2 | | R5 | ~SP3 |
| | R4 | G3 | B4 | R3 | G4 | B3 | | R4 | ~SP4 |
| | R3 | G4 | B3 | R4 | G3 | B4 | | R3 | ~SP5 |
| | R2 | G5 | B2 | R5 | G2 | B5 | | R2 | ~SP6 |
| | R1 | G6 | B1 | R6 | G1 | B6 | | R1 | ~SP7 |
| | R0 | G7 | B0 | R7 | G0 | B7 | | R0 | ~SP8 |
| | G7 | B0 | R7 | G0 | B7 | R0 | | G7 | ~SP9 |
| | G6 | B1 | R6 | G1 | B6 | R1 | | G6 | ~SP10 |
| | G5 | B2 | R5 | G2 | B5 | R2 | | G5 | ~SP11 |
| | G4 | B3 | R4 | G3 | B4 | R3 | | G4 | ~SP12 |
| | G3 | B4 | R3 | G4 | B3 | R4 | | G3 | ~SP13 |
| | G2 | B5 | R2 | G5 | B2 | R5 | | G2 | ~SP14 |
| | G1 | B6 | R1 | G6 | B1 | R6 | | G1 | ~SP15 |
| | G0 | B7 | R0 | G7 | B0 | R7 | | G0 | ~SP16 |
| | B7 | R0 | G7 | B0 | R7 | G0 | | B7 | ~SP17 |
| | B6 | R1 | G6 | B1 | R6 | G1 | | B6 | ~SP18 |
| | B5 | R2 | G5 | B2 | R5 | G2 | | B5 | ~SP19 |
| | B4 | R3 | G4 | B3 | R4 | G3 | | B4 | ~SP20 |
| | B3 | R4 | G3 | B4 | R3 | G4 | | B3 | ~SP21 |
| | B2 | R5 | G2 | B5 | R2 | G5 | | B2 | ~SP22 |
| | B1 | R6 | G1 | B6 | R1 | G6 | | B1 | ~SP23 |
| | B0 | R7 | G0 | B7 | R0 | G7 | | B0 | ~SP24 |

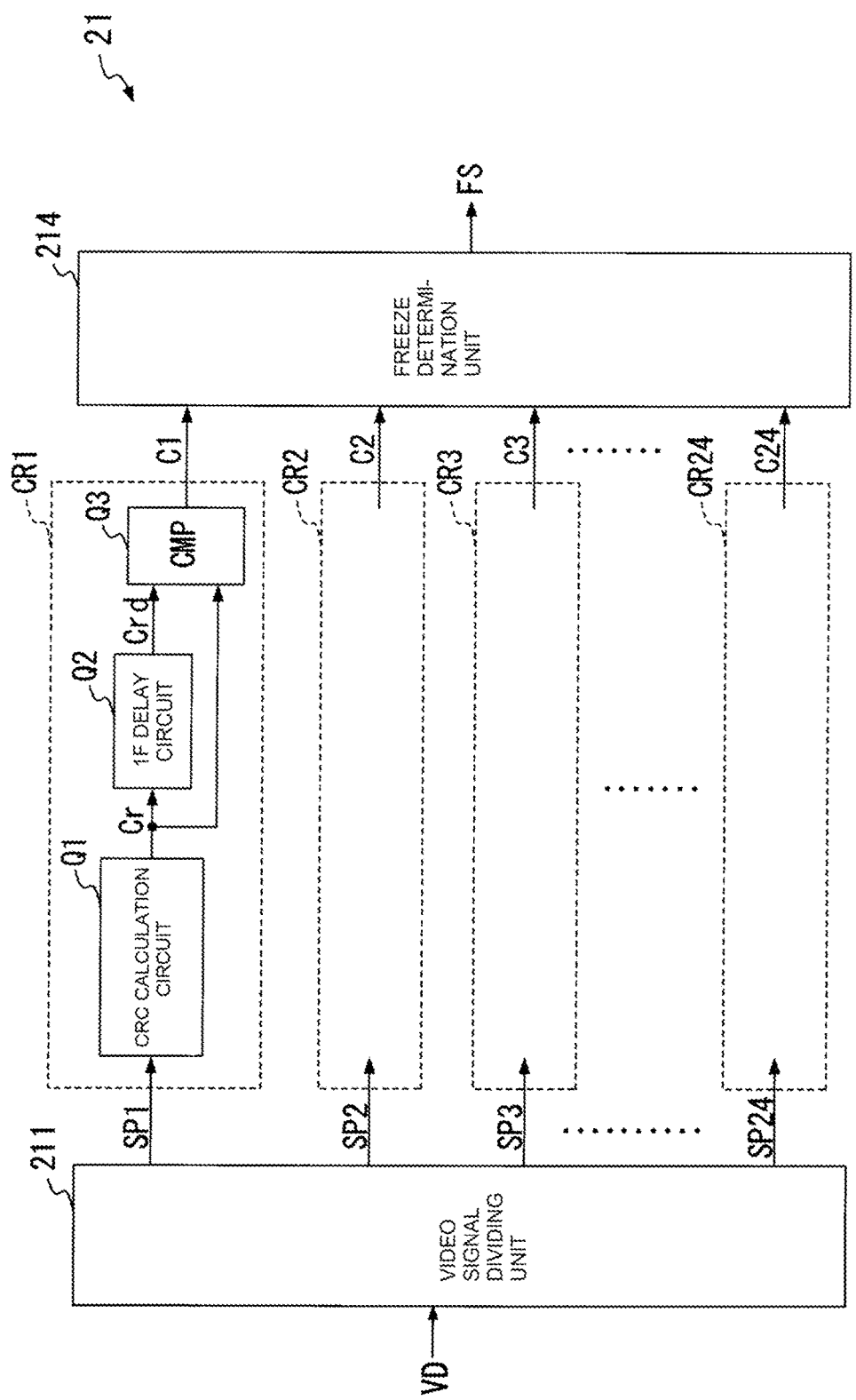

FIG. 7

| SP6 | SP12 | SP18 | SP24 |
|---|---|---|---|
| SP5 | SP11 | SP17 | SP23 |
| SP4 | SP10 | SP16 | SP22 |
| SP3 | SP9 | SP15 | SP21 |
| SP2 | SP8 | SP14 | SP20 |
| SP1 | SP7 | SP13 | SP19 |

FM

VIDEO SIGNAL PROCESSING DEVICE, VIDEO FREEZE DETECTION CIRCUIT AND VIDEO FREEZE DETECTION METHOD

CROSS REFERENCE TO RELATED APPLICATIONS

This application is based upon and claims the benefit of priority of the prior Japanese Patent Application No. 2019-014013, filed on Jan. 30, 2019 and the prior Japanese Patent Application No. 2020-011750, filed on Jan. 28, 2020, the entire contents of which are incorporated herein by reference.

TECHNICAL FIELD

The present invention relates to a video signal processing device that detects an unchanging state of a video signal, a video freeze detection circuit, and video freeze detection method.

BACKGROUND ART

To this date, a vehicle display system that presents, in an in-vehicle display, a video of the area ahead of the vehicle or a video of the area behind the vehicle, which is captured by an in-vehicle camera, to provide assistance to the driver of the vehicle has been proposed (see Patent Document 1 Japanese Patent Application Laid-open Publication No. 2018-79839, for example).

Such a vehicle display system is configured to perform a freeze response process when video freezing is detected where the landscape to be captured by the camera is changing but the video based on the video signal captured by the camera is not changing. Video freezing occurs when the camera that is configured to capture the landscape while driving breaks down, and the failed camera keeps outputting the same video data of one frame that is immediately preceding the failure, for example.

In order to address this problem, the vehicle display system described above is configured to compare video data of the current frame captured by the camera and video data of the previous frame, and if the two pieces of data match, the system determines that the video is frozen. However, because the size of video data is large in general, if a piece of video data is to be directly compared with another piece of video data, the comparison process would result in a large processing load. Thus, in order to reduce such a load, this vehicle display system is proposing to compare hash values obtained by performing SHA, MD5, and CRC (cyclic redundancy check) on the video data, instead of comparing two pieces of video data.

SUMMARY OF THE INVENTION

Problems to be Solved by the Invention

However, when the camera has the above-mentioned problem, and noise or the like enters a transmission path between the cameral and the display device, the CRC check value, which is the hash value, for example, is affected by the noise and changes at every frame.

As a result, the video data of the current frame on the transmission path does not match the video data of the previous frame even though the video signal captured by the camera is frozen, which makes it difficult to detect the video signal being frozen.

The present invention was made in view of this problem, and aims at providing a video signal processing device that can detect a frozen video signal even when noise is present, for example, as well as a video freeze detection circuit, and a video freeze detection method.

A signal processing device of the present invention includes: a video signal dividing unit configured to receive a video signal constituted of a series of frames and divide a video signal into first to k-th (k is an integer of 2 or greater) partial video signals for each frame; a video change detection unit configured to determine, for each of the first to k-th partial video signals, whether or not a video based on the partial video signals has changed between respective frames, and generate first to k-th video change detection signals representing the respective detection results; and a video sameness determination unit configured to generate a video sameness signal indicating that the video signal has not changed, if the number of video change detection signals that indicate the video based on the partial video signal has not changed, among the first to k-th video change detection signals, is greater than a prescribed number.

A video freeze detection circuit according to the present invention includes: a video signal dividing unit configured to divide a video signal constituted of a series of frames into first to k-th (k is an integer of 2 or greater) partial video signals for each frame; a video change detection unit configured to determine, for each of the first to k-th partial video signals, whether or not a video based on the partial video signals has changed between respective frames, and generate first to k-th video change detection signals indicating the respective detection results; and a freeze determination unit configured to find an average number of the video change detection signals that indicate that the video based on the partial video signals has not changed among the first to k-th video change detection signals in M frames (M is an integer of 2 or greater), and generate a freeze detection signal indicating that the video signal is frozen, if the average number is greater than a prescribed number.

A video freeze detection method according to the present invention includes: dividing a video signal constituted of a series of frames into first to k-th (k is an integer of 2 or greater) partial video signals for each frame; determining, for each of the first to k-th partial video signals, whether or not a video based on the partial video signals has changed between respective frames; generating first to k-th video change detection signals indicating the respective detection results; finding an average number of the video change detection signals that indicates the video based on the partial video signals has not changed in an M-frame period (M is an integer of 2 or greater), among the first to k-th video change detection signals; and outputting a freeze detection signal indicating that the video signal is frozen if the average number is greater than a prescribed number.

The present invention divides a video signal of one frame into a plurality of partial video signals, determines whether each of the partial video signals has changed from one frame to another frame, and outputs a video sameness signal that indicates that the video signal has not changed if the number of video change detection signals indicating that the video has not changed is greater than a prescribed number.

With this configuration, even when video signals corresponding to respective frames partially differ from each other due to noise or the like despite the fact that the video signal is frozen, it is possible to obtain the correct detection result indicating that the video signal is frozen.

BRIEF DESCRIPTION OF THE DRAWINGS

FIG. 4 is a diagram showing an example of how the captured video signal VD is divided by the video signal dividing unit 211.

FIG. 5 is a block diagram showing another example of the internal configuration of the video freeze detection circuit 21.

FIG. 7 is a diagram showing yet another example of how the captured video signal VD is divided by the video signal dividing unit 211.

DETAILED DESCRIPTION OF THE EMBODIMENTS

Figure 1:
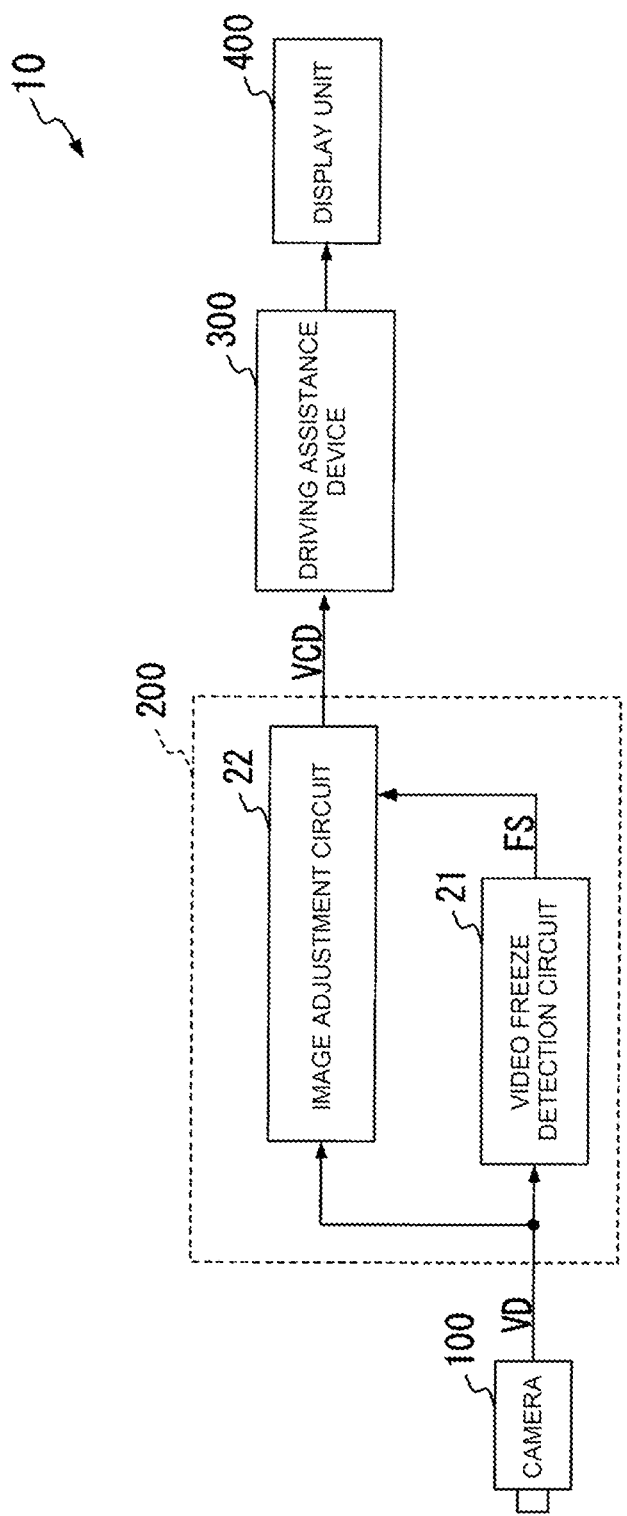
FIG. 1 is a block diagram showing a schematic configuration of a driving assistance system 10 including a video signal processing device of the present invention.

FIG. 1 is a block diagram showing a schematic configuration of a driving assistance system 10 including a video signal processing device of the present invention.

As illustrated in FIG. 1, the driving assistance system 10 includes a camera 100, a video signal processing device 200, a driving assistance device 300, and a display device 400.

The camera 100 is installed in a vehicle, captures landscapes in front of and behind the vehicle, as well as on both sides of the vehicle, generates a video signal including a series of pixel data pieces corresponding to respective pixels, and supplies this signal, as a captured video signal VD, to the video signal processing device 200.

Figure 2:
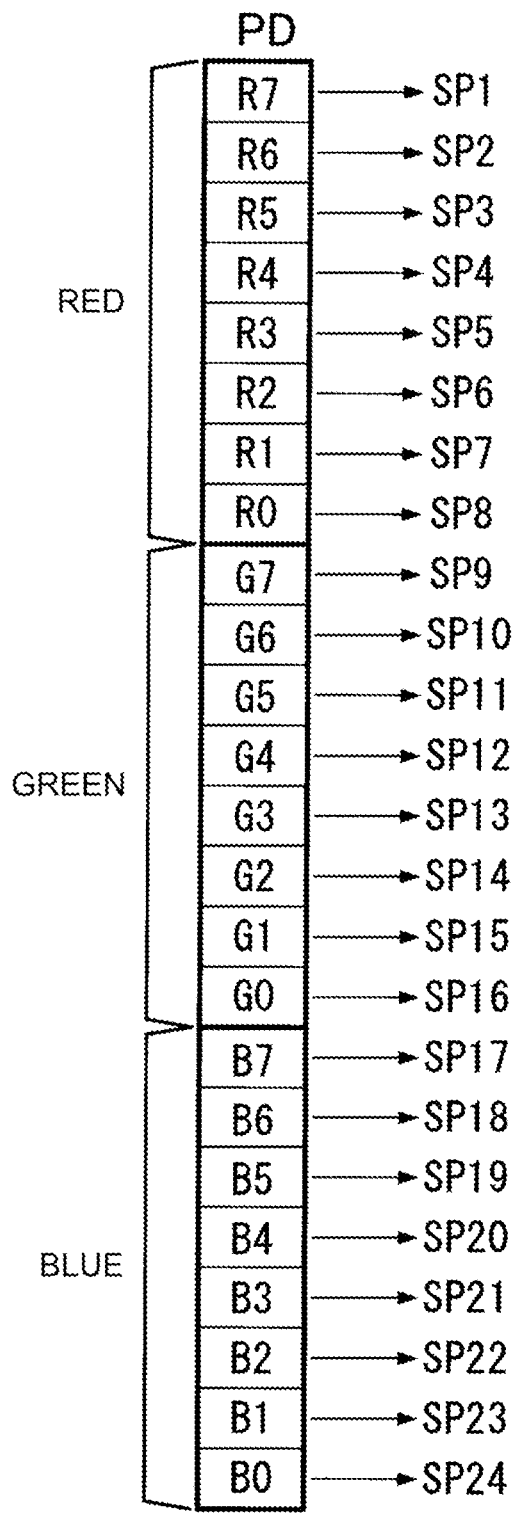
FIG. 2 is a diagram showing an example of the data format of pixel data PD in a captured video signal VD.

FIG. 2 is a diagram showing an example of the data format of pixel data PD for one pixel in the captured video signal VD.

As illustrated in FIG. 2, the pixel data PD is data of 24 bits in total including, for example, bits R7 to R0 representing the red brightness level in 8 bits, bits G7 to G0 representing the green brightness level in 8 bits, and bits B7 to B0 representing the blue brightness level in 8 bits. Therefore, when the number of pixels in one frame in the captured video signal VD is n (n is an integer of 2 or more), the captured video signal VD including "n" pieces of pixel data PD having the data format illustrated in FIG. 2 is supplied to the video signal processing device 200 for every frame.

The video signal processing device 200 includes a video freeze detection circuit 21 and a video adjustment circuit 22. The video freeze detection circuit 21 determines whether the video captured by the camera 100 is changing or not, or in other words, frozen or not, and supplies a freeze detection signal FS indicating the detection result to the video adjustment circuit 22. That is, the video freeze detection circuit 21 supplies to the video adjustment circuit 22 the freeze detection signal FS, which indicates "frozen" when the video is frozen, and indicates "not frozen" when the video is not frozen.

When the video adjustment circuit 22 receives the freeze detection signal FS indicating "not frozen", the image adjustment circuit 22 adjusts the color, brightness, contrast and the like of the captured video signal VD, and supplies a signal obtained thereby to the driving assistance device 300. On the other hand, when the video adjustment circuit 22 receives the freeze detection signal FS indicating "frozen," the video adjustment circuit 22 supplies a video signal indicating "frozen" to the driving assistance device 300 as the captured video signal VCD. For example, the video adjustment circuit 22 supplies to the driving assistance device 300 the captured video signal VCD indicating that the captured video is frozen through texts or a single-color screen (blue, for example).

The driving assistance device 300 performs various types of driving assistance controls such as a distance control to keep a safe distance between the subject vehicle and the vehicle driving ahead, a keep-lane control to assist the driver to stay between their lanes, an approaching object alert control to inform the driver when another vehicle is approaching, and a collision prevention control, based on the captured video signal VCD. The driving assistance device 300 supplies, to the display unit 400, a driving assistance image signal, which is an image indicating various alerts or instructions corresponding to the driving assistance control. The driving assistance device 300 may supply to the display unit 400 a monitor image signal, which is a video signal obtained by superimposing the alert or instruction on an image based on the captured video signal VCD, or the captured video signal VCD itself.

Further, the driving assistance device 300 has the GPS function that shows the current position of the vehicle or a route guidance to the destination, and supplies to the display unit 400 a map image signal showing a map image of the surrounding area including the current position of the vehicle.

The display unit 400 includes, for example, a light emitting indicator mounted on a side-view mirror or a display for a rear monitor that serves as a rear-view mirror, in addition to a main display that displays an image based on the map image signal and the driving assistance image signal described above. For example, when the camera 100 captures a video of the area behind the vehicle, the rear monitor display shows a video based on the captured video signal VCD. When the video freeze detection circuit 21 detects that the video captured by the camera 100 is frozen, the main display and the rear monitor display show an image indicating the fact by texts or a single-color screen.

Below, the configuration of the video freeze detection circuit 21 will be explained in detail.

Figure 3:
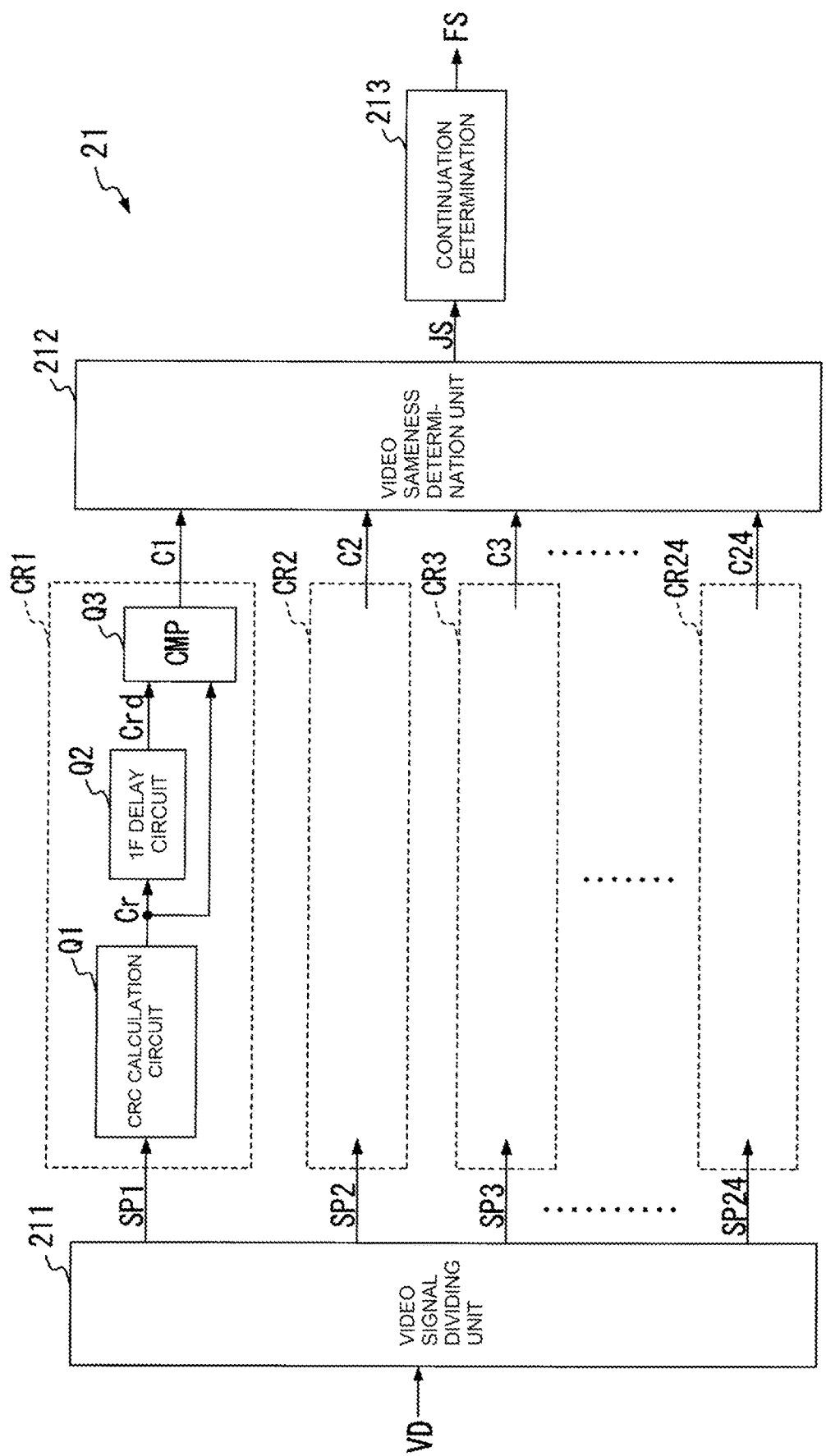
FIG. 3 is a block diagram showing an example of the internal configuration of the video freeze detection circuit 21.

FIG. 3 is a block diagram showing an example of the internal configuration of the video freeze detection circuit 21.

As illustrated in FIG. 3, the video freeze detection circuit 21 includes a video signal dividing unit 211, a video change detection unit CR1 to CR24, a video sameness determination unit 212, and a continuation determination unit 213.

The video signal dividing unit 211 receives the captured video signal VD from the camera 100, divides this captured video signal VD into 24 pieces for one frame of the captured video signal VD, thereby obtaining partial video signals SP1 to SP24.

For example, the video signal dividing unit 211 divides each pixel data PD for one frame (n-number) into 24 pieces corresponding to 24 bits (R7 to R0, G7 to G0, B7 to B0) shown in FIG. 2. The video signal dividing unit 211 groups together the respective bits obtained by dividing the n-number of pixel data PD into 24 pieces by the bit digit to generate 24 types of bit sequences, thereby obtaining the partial video signals SP1 and SP24 corresponding to the respective bit digits. For example, the video signal dividing unit 211 obtains a partial video signal SP1 representing a bit sequence constituted of a sequence of n bits R7, a partial video signal SP2 representing a bit sequence constituted of a sequence of n bits R6, . . . , and a partial video signal SP24 representing a bit sequence constituted of a sequence of bits B0. Each of the partial video signals SP1 to SP24 corresponds to one of the video change detection units CR1 to CR24.

The video signal dividing unit 211 supplies the partial video signals SP1 to SP24 to the video change detection units CR1 to CR24. That is, the video signal dividing unit 211 supplies a partial video signal SPk (k is an integer of 1 to 24) to a video change detection unit CRk.

The video change detection units CR1 to CR24 each has the same internal configuration. That is, each of the video change detection units CR1 to CR24 includes a CRC calculation circuit Q1, a 1F delay circuit Q2, and a comparison circuit Q3.

Below, the internal configuration of CR1 will be explained as an example of the video change detection units CR1 to CR24.

The CRC calculation circuit Q1 of the video change detection unit CR1 takes in the sequence of bits R7 in the partial video signal SP1 for each frame (n), and performs CRC (Cyclic Redundancy Check) operation on the n-bit sequence made up of the sequence of n-number of bits R7. That is, the CRC calculation circuit Q1 calculates the remainder when the n-bit sequence corresponding to each frame is divided by a predetermined generation polynomial. The CRC calculation circuit Q1 then supplies the remainder for each frame to the 1F delay circuit Q2 and the comparison circuit Q3 as a check value Cr. The 1F delay circuit Q2 supplies a delayed check value Crd, which is the check value Cr delayed by a period of time equivalent to one frame, to the comparison circuit Q3. The comparison circuit Q3 determines whether the check value Cr is the same as the delayed check value Crd, and supplies to the video sameness determination unit 212, a video change detection signal C1 that indicates "no change" if the two values are the same, and indicates "changed" if the two values differ from each other.

With this configuration, the video change detection unit CR1 first performs CRC calculation on a n-bit sequence represented by the partial video signal SP1, that is, a bit sequence made up of a group of bits R7 from each of the n-number of pixel data PD for one frame, thereby obtaining a check value. In this process, if the check value (Cr) of the current frame matches the check value (Crd) of the previous frame, the video change detection unit CR1 determines that the video has not changed between those two frames, and generates a video change detection signal C1 indicating "no change." On the other hand, if the check value (Cr) of the current frame does not match the check value (Crd) of the previous frame, the video change detection unit CR1 determines that the video has changed between those two frames, and generates a video change detection signal C1 indicating "changed".

Thus, the video change detection units CR1 to CR24 each including the CRC calculation circuit Q1, the 1F delay circuit Q2, and the comparison circuit Q3 obtain the CRC check value by performing CRC calculation on the corresponding partial video signals SP1 to SP24 for each frame.

Then, each of the video change detection units CR1 to CR24 compares the check values between the two consecutive frames to determine whether the video has changed or not, and generates video change detection signals C1 to C24 that indicate the detection results respectively.

The video sameness determination unit 212 determines that the video based on the captured video signal VD has not changed if the number of video change detection signals indicating "no change" among the video change detection signals C1 to C24 is greater than a prescribed number L, and supplies a video sameness signal JS indicating the fact to the continuation determination unit 213.

The continuation determination unit 213 outputs the freeze detection signal FS indicating "frozen" if the video sameness signal JS continues over M number of frames (M is an integer of 1 or greater), and outputs the freeze detection signal FS indicating "not frozen" otherwise.

This way, the video freeze detection circuit 21 of FIG. 3 can output the freeze detection signal FS indicating that the video is frozen when the captured video is actually frozen but the video signals corresponding to the respective frames differ from each other due to noise or the like.

That is, if the number of partial video signals detected with a change in video among the partial video signals SP1 to SP24 does not exceed the prescribed number L, the video freeze detection circuit 21 determines that the change in video is due to noise or the like and that the captured video itself has not changed. When this state continues over M frames, the video freeze detection circuit 21 determines that the captured video is frozen, and outputs the freeze detection signal FS indicating that "the video is frozen."

Thus, with the video freeze detection circuit 21, it is possible to accurately detect when the video captured by the cameral 100 is frozen, even if noise is present.

In the embodiment described above, the video signal dividing unit 211 divides the captured video signal VD by grouping together each of 24 bits of n-number of pixel data PD having the same bit digit for each frame, and obtains 24 partial video signals SP1 to SP24.

Alternatively, the video signal dividing unit 211 may also change the corresponding relationships between the respective bit digits and the partial video signals SP1 to SP24 in dividing the n-number of pixel data PD into the partial video signals SP1 to SP24 corresponding to the respective bit digits.

FIG. 4 is a diagram showing an example of bit groups included in each of the partial video signals SP1 to SP24 grouped together in view of the point mentioned above.

That is, the video signal dividing unit 211 groups together respective bits for each color (red, green, blue) of pixel data PD1 to PD(n) of one frame so that each group corresponds to one of the partial video signals SP1 to SP24 in a manner depicted by the broken line of FIG. 4.

For example, as illustrated in FIG. 4, the video signal dividing unit 211 selects and groups together one bit from the 7-th bit group (R7, G7, and B7) and the 0-th bit group (R0, G0, B0) for each color from each pixel data PD1 to PD(n), thereby obtaining the partial video signal SP1. Also, as illustrated in FIG. 4, the video signal dividing unit 211 selects and groups together one bit from the 6-th bit group (R6, G6, B6) and the first bit group (R1, G1, and B1) for each color from each pixel data PD1 to PD(n), thereby obtaining the partial video signal SP2. Also, as illustrated in FIG. 4, the video signal dividing unit 211 selects and groups together one bit from the 5-th bit group (R5, G5, B5) and the second bit group (R2, G2, and B2) for each color from each pixel data PD1 to PD(n), thereby obtaining the partial video signal SP3. Also, as illustrated in FIG. 4, the video signal dividing unit 211 selects and groups together one bit from the 4-th bit group (R4, G4, B4) and the third bit group (R3, G3, B3) for each color from each pixel data PD1 to PD(n), thereby obtaining the partial video signal SP4.

Below, the reason for dividing the captured video signal VD in the manner illustrated in FIG. 4, instead of FIG. 2, will be explained.

When a change in the video between two consecutive frames is to be detected based on the CRC check values, there are some cases in which the check values of the two consecutive frames coincide with each other despite the fact that the video signal has changed from one frame to another frame.

In particular, if freeze detection is performed using the partial video signals SP1 to SP24 divided in the manner described in FIG. 2, even when the captured video is not frozen, the video could be erroneously determined to be frozen when only some of the colors and some of the bits have changed in the captured video.

For example, if, in the received captured video signal VD, only the bit R0 and the bit R1 in n-number of pixel data PD for one frame have changed from one frame to another frame, only SP7 and SP8, among the partial video signals SP1 to SP24, would be affected. As a result, among the video change detection units CR1 to CR24, only CR7 and CR8 obtain the detection result of "changed," while all the video change detection units except for CR7 and CR8 obtain the detection results of "no change." Therefore, at this time, the video freeze detection circuit 21 may output an erroneous freeze detection signal FS indicating "frozen" despite the fact that the captured video is not frozen.

On the other hand, when freeze detection is performed using the partial video signals SP1 to SP24 divided in the manner illustrated in FIG. 4, the respective bits (R7 to R0, G7 to G0, B7 to B0) in the pixel data PD are allocated to a plurality of different partial video signals. For example, in the example of FIG. 4, the bit R0 and the bit R1 of each pixel data PD correspond to the partial video signals SP1, SP2, SP7, SP8, SP15 to SP18 and SP23 and SP24. Therefore, because many of the video change detection units CR1 to CR24 (CR1, CR2, CR7, CR8, CR15 to CR18, CR23 and CR24) obtain the detection result of "changed," it is possible to reduce the probability of the false detection result indicating that the video is frozen.

In the embodiment described above, the captured video signal VD is divided into 24 partial video signals (SP1 to SP24) for each frame, and whether or not the video has changed is determined for each of the partial video signals. However, the number of partial signals obtained from the captured video signal VD is not limited to 24. Further, the method of dividing the captured video signal VD is not limited to those in the embodiment described above. For example, instead of dividing the signal based on each bit of the pixel data PD as in the embodiment described above, it is also possible to divide the signal based on the pixel data PD belonging to a plurality of areas that constitute the entire area of one screen.

Further, in the embodiment described above, the video freeze detection circuit 21 performs freeze detection as described above for the captured video signal VD captured by the camera 100, but it is also possible to perform the freeze detection on a video signal read from a memory in which video signals are stored in advance. Further, in the embodiment described above, as in the data format illustrated in FIG. 2, the captured video signal VD including the pixel data PD representing the brightness levels of red, green, and blue is to be input, but it is also possible to input a video signal having other data formats. That is, there is no limitations on the data format of the video signal to be input as long as the format does not include an error detection code or error correction code.

In the embodiment described above, the CRC check value is used to detect whether or not the video has changed for each partial video signal, but instead of the CRC check value, a hash value based on SHA (Secure Hash Algorithm), MD5 (Message Digest Algorithm 5), or the like may be used.

In summary, a video signal processing device of the present invention includes the video signal dividing unit, video change detection unit, and video sameness determination unit described below.

The video signal dividing unit (211) receives a video signal (VD), and divides the video signal for each frame into first to k-th (k is an integer of 2 or more) partial video signals (SP1 to SP24) corresponding to the frame. The video change detection unit (CR1 to CR24) determines, for each of the first to k-th partial video signals, whether or not a video based on the partial video signals has changed from one frame to another frame, and generates the first to k-th video change detection signals (C1 to C24) representing the respective detection results. The video sameness determination unit (212) generates a video sameness signal (JS) indicating that the video signal has not changed, if the number of video change detection signals that indicate the video based on the partial video signal has not changed is greater than a prescribed number (L), among the first to k-th video change detection signals.

In the embodiment of FIG. 3, the video sameness determination unit 212 and the continuation determination unit 213 determine whether the captured video signal VD is frozen or not based on the video change detection signals C1 to C24, and output a freeze detection signal FS as the determination result.

Thus, the video sameness determination unit 212 and the continuation determination unit 213 may be considered a freeze determination unit as a whole.

FIG. 5 is a block diagram showing another example of the configuration of the video freeze detection circuit 21 made in view of this point.

In the configuration illustrated in FIG. 5, the freeze determination unit 214 replaces the video sameness determination unit 212 and the continuation determination unit 213 of FIG. 3. The configuration and operations of the video signal dividing unit 211 and the video change detection units CR1 and CR24 are the same as those of FIG. 3.

The freeze determination unit 214 outputs the freeze detection signal FS based on the video change detection signals C1 to C24 in a manner similar to the video sameness determination unit 212 and the continuation determination unit 213. The freeze determination unit 214 may alternatively be configured to find an average number of the video change detection signals that indicates the video based on the partial video signal has not changed among the video change detection signals C1 to C24 for M frames (M is an integer of 2 or greater) and output a freeze detection signal FS indicating that the captured video signal VD is frozen if the average number is greater than a prescribed number.

In the example illustrated in FIG. 1, the video freeze detection circuit 21 is used to detect a frozen state of the video signal, but the video freeze detection circuit 21 may also be used for still image detection to determine whether the video signal is a still image or not.

In the embodiment described above, the video signal dividing unit 211 divides the captured video signal VD into the partial video signals SP1 to SP24 in a manner described in FIG. 2 or FIG. 4, but how the video signal is divided is not limited to those.

Figure 6A:
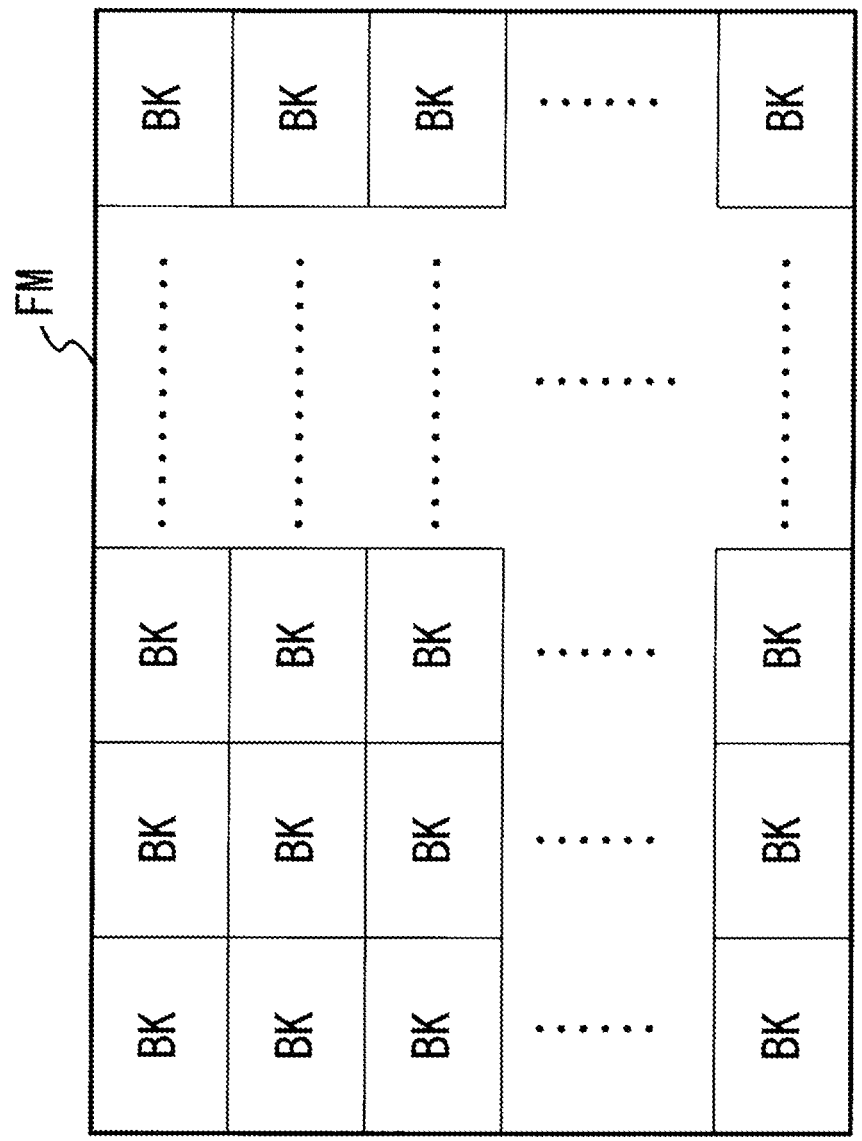
FIG. 6A is a diagram showing another example of how the captured video signal VD is divided by the video signal dividing unit 211.
Figure 6B:
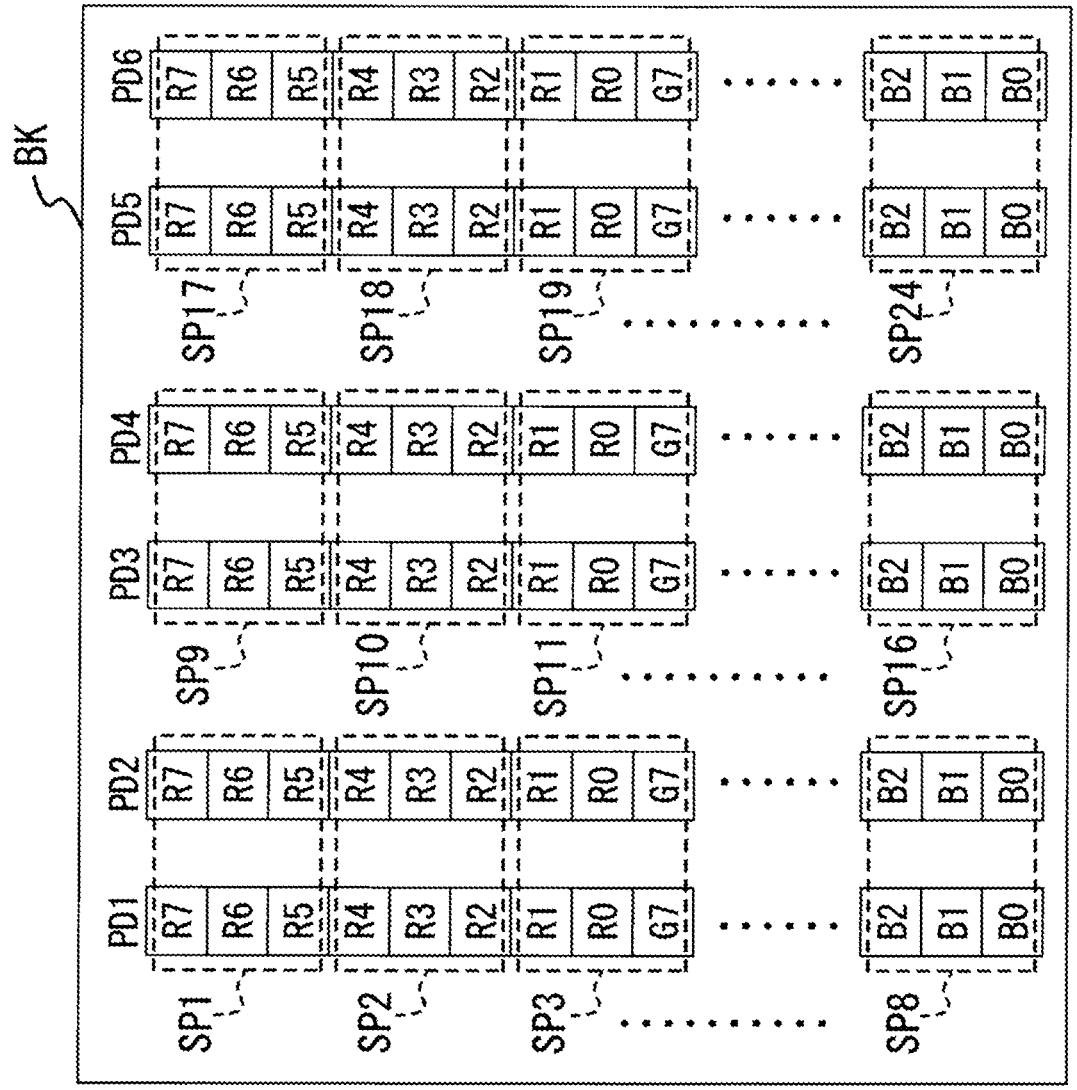
FIG. 6B is a diagram showing another example of how the captured video signal VD is divided by the video signal dividing unit 211.

FIGS. 6A and 6B are diagrams showing another example of how the captured video signal VD is divided by the video signal dividing unit 211.

As shown in FIG. 6A, the video signal dividing unit 211 divides an image area of a frame FM based on the captured video signal VD into a plurality of partial image areas BK. Then the video signal dividing unit 211 divides bits in each of a plurality of pieces of pixel data PD that are used to display an image in each of the partial image areas BK into a plurality of bit groups, groups together the bit groups from different pieces of pixel data PD, and assigns those bit groups to the partial signals SP1 to SP24, respectively.

In one example illustrated in FIG. 6B, the video signal dividing unit 211 first divides each of the pixel data pieces PD1 to PD6 constituted of 24 bits into first to 8th bit groups each constituted of 3 bits in the manner described below.

First bit group (R7 to R5)
Second bit group (R4 to R2)
Third bit group (R1, R0, G7)
Fourth bit group (G6 to G4)
Fifth bit group (G3 to G1)
Sixth bit group (G0, B7, B6)
Seventh bit group (B5 to B3)
Eighth bit group (B2 to B0)

Here, the video signal dividing unit 211 groups together the first bit groups (R7 to R5) of the pixel data PD1 and PD2 as enclosed by the broken line in FIG. 6B to be the partial video signal SP1. The video signal dividing unit 211 groups together the second bit groups (R4 to R2) of the pixel data PD1 and PD2 to be the partial video signal SP2.

In this manner, the video signal dividing unit 211 groups together the same bit groups of the pixel data PD1 and PD2, respectively, to be the partial video signals SP1 to SP8. Similarly, the video signal dividing unit 211 groups together the same bit groups of the pixel data PD3 and PD4, respectively, to be the partial video signals SP9 to SP16.

Furthermore, the video signal dividing unit 211 groups together the same bit groups of the pixel data PD5 and PD6, respectively, to be the partial video signals SP17 to SP24.

The video signal dividing unit 211 supplies the partial video signals SP1 to SP24 obtained by grouping together the partial video signals SP of the same digit to the video sameness determination unit 212 of FIG. 3 or the freeze determination unit 214 of FIG. 5.

Below, the reason for dividing the captured video signal VD in the manner illustrated in FIGS. 6A and 6B, instead of FIG. 2 or 4, will be explained.

With the freeze detection using the partial video signals SP1 to SP24 divided in the manner described in FIG. 2 or FIG. 4, in a special circumstance where all pieces of pixel data PD but one piece of pixel data PD are frozen, that is, if R7 to R0, G7 to G0, B7 to B0 of one pixel data piece have changed between two frames, but all other pieces of pixel data have not changed, for example, the video change detection signals C1 to C24 would all be showing "changed." For particular usages where this kind of special circumstance could occur, the dividing method of FIG. 2 or FIG. 4 would not be appropriate.

On the other hand, with the partial video signals SP1 to SP24 divided in the manner described with FIGS. 6A and 6B, when all pieces of pixel data PD except for one piece of pixel data PD are frozen, most of the video change detection signals C1 to C24 would indicate "no change."

For example, when the pixel data PD1 in the frame FM is experiencing a change between the frame periods, but other pieces of pixel data PD2 to PD9(n) are frozen, out of the video change detection signals C1 to C24, three video change detection signals C1 to C3 corresponding to the partial video signals SP1 to SP3 associated with the pixel data PD1 would indicate "changed." That is, all other video change detection signals C4 to C24 except for the video change detection signal C1 to C3 would indicate "no change." Thus, in this case, the video sameness determination unit 212 determines that the video based on the captured video signal VD has not changed, and outputs the video sameness signal JS indicating that fact.

As described above, with the video dividing method as illustrated in FIGS. 6A and 6B, it is possible to accurately detect the substantial frozen state of the captured video signal VD where only part of the pixel data in the frame FM indicates that the video has changed between two frames.

In the example of FIGS. 6A and 6B, pieces of pixel data corresponding to the two adjacent pixels are grouped together, but the present invention is not limited to this.

That is, the image area for one frame based on the video signal is divided into a plurality of partial image areas, and the video signal dividing unit 211 divides each of a plurality of pixel data pieces used for image display in the respective partial image areas into a plurality of bit groups. Then the video signal dividing unit 211 groups together the bit groups from different pixel data pieces, thereby obtaining the first to k-th groups, and further groups together each of the first to k-th groups from the plurality of partial image areas, thereby obtaining the first to k-th partial video signals.

FIG. 7 is a diagram showing another example of how the captured video signal VD is divided by the video signal dividing unit 211.

That is, as illustrated in FIG. 7, the video signal dividing unit 211 divides an image area of a frame FM based on the captured video signal VD into first to 24-th partial image areas. The first to 24-th partial image areas respectively correspond to the partial video signals SP1 to SP24 as illustrated in FIG. 7.

That is, the video signal dividing unit 211 obtains the partial video signals SP by grouping together the respective bits of the pixel data PD used for image display in each of the first to 24-th partial image areas. For example, the video signal dividing unit 211 obtains the partial video signal SP1 by grouping together the respective bits of the pixel data PD used for image display in the first partial image area, and obtains the partial video signal SP2 by grouping together the respective bits of the pixel data PD used for image display in the second partial image area.

The video signal dividing unit 211 supplies, to the video sameness determination unit 212 or the freeze determination unit 214, the partial video signals SP1 to SP24 obtained by dividing the captured video signal VD of the frame FM into 24 groups respectively corresponding to the 24 partial image areas of the frame FM as illustrated in FIG. 7.

Below, the reason for dividing the captured video signal VD in the manner described with FIG. 7, instead of FIG. 2 or 4, will be explained.

The freeze detection using the partial video signals SP1 to SP24 obtained by dividing the captured video signal VD in the manner described with FIG. 2 or FIG. 4 is not appropriate for a usage that could cause a special circumstance where all pieces of pixel data PD but one piece of pixel data PD are frozen as described above.

On the other hand, with the division method of FIG. 7, when the video is changing in some of the partial image areas of the frame FM and all other partial image areas are frozen, only the video change detection signals C based on the partial video signals SP corresponding to those partial image areas indicate "changed." Thus, in this case, the video sameness determination unit 212 determines that the video based on the captured video signal VD has not changed, and outputs the video sameness signal JS indicating that fact.

As described above, with the video division method described with FIG. 7, it is possible to accurately detect the substantial frozen state of the captured video signal VD where only part of the pixel data in the frame FM indicates that the video has changed between two frames.

In the embodiment above, the frame FM is divided into 24 sections and 24 partial video signals SP1 to SP24 corresponding to the respective sections are generated, but the number of divided sections is not limited to 24.

That is, the video signal dividing unit 211 divides an image area for one frame based on the video signal into k-number of partial image areas, and groups together a plurality of pixel data pieces used for image display in the respective k-number of partial image areas into the first to k-th partial video signals, respectively.

The freeze state of the captured video signal VD includes, not only the state in which the same or approximately the same video continues from one frame to another frame as described above, but also a state in which a plurality of frames each representing a different video are periodically repeated. (Hereinafter, referred to as periodic freeze).

For example, when the camera 100 is a camera that includes a plurality of output buffers each capable of storing captured video signals for one frame and that outputs the captured video signals read out from the respective output buffers successively as the captured video signal VD, the periodic freeze described above possibly occurs.

Figure 8:
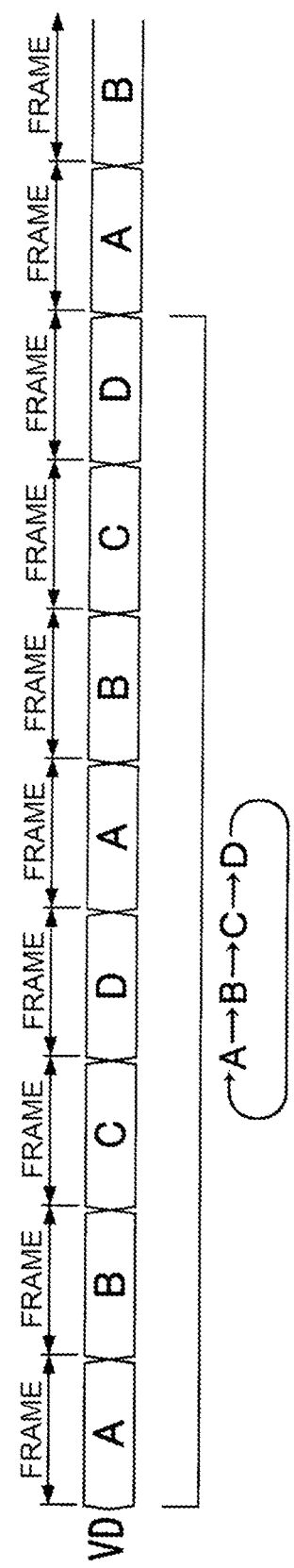
FIG. 8 is a diagram showing an example of periodic freezing, which is video freezing that occurs in the captured video signal VD.

FIG. 8 is a diagram showing an example of the periodic freeze that occurs in the captured video signal VD due to a failure of the camera 100 when a camera having four output buffers is used for the camera 100.

The example of FIG. 8 illustrates the captured video signal VD output from the camera 100 when the camera 100 breaks down and the first to fourth buffers have stored therein captured video signals representing video A, video B, video C, and video D for each frame, which have different video contents, respectively. That is, if the camera 100 having such a configuration breaks down, the periodic freeze occurs in which the captured videos A to D having different contents for respective frames repeatedly appear in that order at a cycle of four frames.

Figure 9:
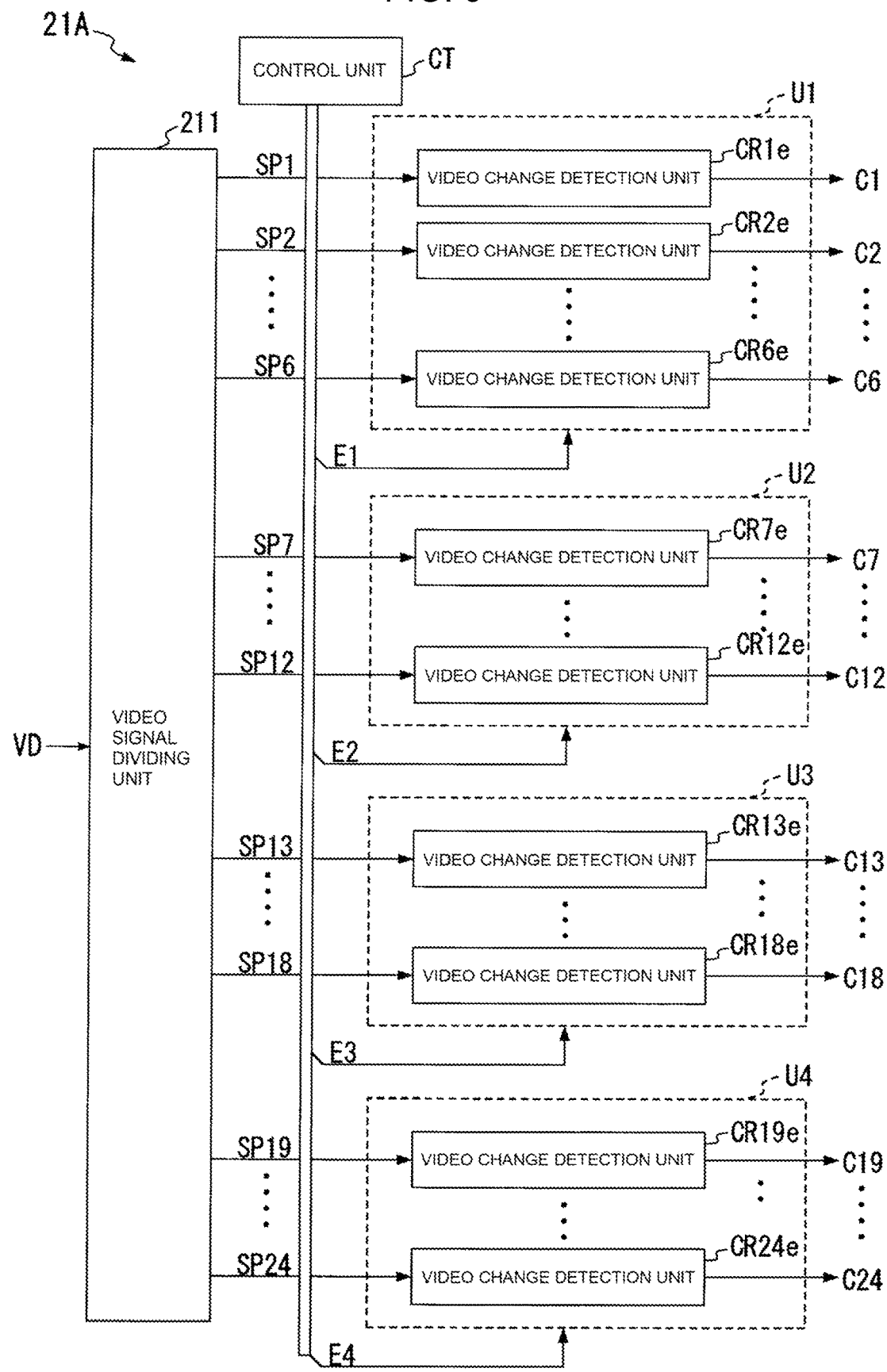
FIG. 9 is a block diagram showing an example of the internal configuration of the video freeze detection circuit 21A that can detect the periodic freeze.

In view of this problem, FIG. 9 is a block diagram illustrating the internal configuration of a video freeze detection circuit 21A that can detect the periodic freeze of the four-frame cycle as illustrated in FIG. 8.

Similar to the video freeze detection circuit 21 described above, the video freeze detection circuit 21A has the video signal dividing unit 211 that divides the captured video signal VD in a manner shown in FIG. 2, 4, 6A and 6B, or 7 to obtain the partial video signals SP1 to SP24.

The video freeze detection circuit 21A further includes a video sameness determination unit and a continuation determination unit 213 shown in FIG. 3, but those are not shown in FIG. 9.

That is, the video freeze detection circuit 21A has the same configuration as the video freeze detection circuit 21 of FIG. 3 or 5 except that the control unit CT is newly provided, and the video change detection units CR1e to CR24e are used instead of the video change detection units CR1 to CR24 of FIG. 3.

The video change detection units CR1e to CR24e illustrated in FIG. 9 are the same as the video change detection units CR1 to CR24, respectively, except for having the function of switching between the active state (enabled state) and the inactive state (disabled state) based on the enable signal. That is, each of the video change detection units CR1e to CR24e has the CRC calculation circuit Q1, the 1F delay circuit Q2, and the comparison circuit Q3 shown in FIG. 3, similarly to each of the video change detection units CR1 to CR24. However, these CRC calculation circuit Q1, 1F delay circuit Q2, and comparison circuit Q3 perform the above-mentioned operations while the enable signal with the logic level 1 is supplied, and stop those operations while the enable signal with the logic level 0 is supplied.

The 1F delay circuit Q2 is constituted of a buffer memory that takes in and holds the check value Cr supplied from the CRC calculation circuit Q1 while the enable signal of the logic level 1 is supplied, and outputs this value as the delay check value Crd after one frame period has passed. On the other hand, the 1F delay circuit Q2 stops taking in the check value Cr while the enable signal of the logic level 0 is supplied, and outputs the check value Cr that has been held therein as the delay check value Crd.

Figure 10:
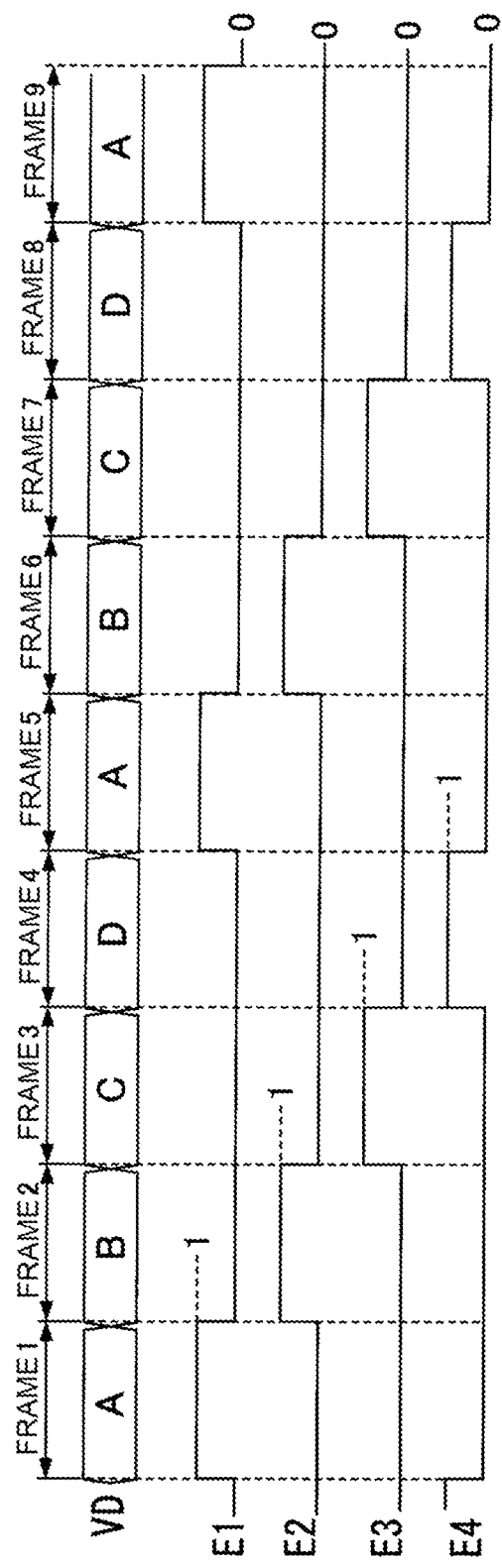
FIG. 10 is a time chart showing an example of the captured video signal VD having the periodic freeze and enable signals E1 to E4.

The control unit CT generates enable signals E1 to E4 illustrated in FIG. 10 as the enable signal described above, synchronously with the respective frames of the captured video signal VD.

That is, the control unit CT generates the enable signal E1 that has the logic level 1, which indicates the enable state, in the (4m−3)-th frame (m is an integer of 1 or more) in the captured video signal VD, and has the logic level 0, which indicates the disable state, in other frames. The control unit CT generates the enable signal E2 that has the logic level 1, which indicates the enable state, in the (4m−2)-th frame in the captured video signal VD, and has the logic level 0, which indicates the disable state, in other frames. The control unit CT generates the enable signal E3 that has the logic level 1, which indicates the enable state, in the (4m−1)-th frame in the captured video signal VD, and has the logic level 0, which indicates the disable state, in other frames. The control unit CT generates the enable signal E4 that has the logic level 1, which indicates the enable state, in the (4m)-th frame in the captured video signal VD, and has the logic level 0, which indicates the disable state, in other frames.

The control unit CT supplies the enable signal E1 to the first detection circuit U1 constituted of the video change detection units CR1e to CR6e that respectively receive the partial video signals SP1 to SP6. The control unit CT supplies the enable signal E2 to the second detection circuit U2 constituted of the video change detection units CR7e to CR12e that respectively receive the partial video signals SP7 to SP12. The control unit CT supplies the enable signal E3 to the third detection circuit U3 constituted of the video change detection units CR13e to CR18e that respectively receive the partial video signals SP13 to SP18. The control unit CT supplies the enable signal E4 to the fourth detection circuit U4 constituted of the video change detection units CR19e to CR24e that respectively receive the partial video signals SP19 to SP24.

Then, in Frame 1 of FIG. 10, the video change detection units CR1e to CR6e of the first detection unit U1 are activated in accordance with the enable signal E1 with the logic level 1. As a result, in each of the video change detection unit CR1e to CR6e, the 1F delay circuit Q2 takes in the check value Cr based on each of the partial video signals SP1 to SP6 corresponding to the captured video A of Frame 1. In Frames 2 to 4 subsequent to Frame 1, as illustrated in FIG. 10, the enable signal E1 has the logic level 0, which stops the operations of the video change detection units CR1e to CR6e. Thus, during this period, the 1F delay circuit Q2 of each of the video change detection units CR1e to CR6e holds the check value Cr based on each of the partial video signals SP1 to SP6 corresponding to the captured video A.

Then, in Frame 5 of FIG. 10, the video change detection units CR1e to CR6e are activated in accordance with the enable signal E1 with the logic level 1. As a result, in each of the video change detection unit CR1e to CR6e, the 1F delay circuit Q2 takes in the check value Cr based on each of the partial video signals SP1 to SP6 corresponding to the captured video A of Frame 5, and the check value Cr is also supplied to the comparison circuit Q3. Furthermore, during this period, the check values Cr that have been held by the 1F delay circuit Q2 of the respective video change detection units CR1e to CR6e, which are based on the partial video signals SP1 to SP6 corresponding to the captured video A of Frame 1, are output from the 1F delay circuit Q2, and supplied to the comparison circuit Q3 as the delayed check values Crd. As illustrated in FIG. 10, the capture video of Frame 1 and the captured video of Frame 5 are both the captured video A. Thus, in Frame 5, the video change detection units CR1e to CR6e supply the video change detection signals C1 to C6 each indicating "no change" to the video sameness determination unit 212.

In Frame 2 of FIG. 10, for example, the video change detection units CR7e to CR12e of the first detection unit U2 are activated in accordance with the enable signal E2 with the logic level 1. As a result, in each of the video change detection unit CR7e to CR12e, the 1F delay circuit Q2 takes in the check value Cr based on each of the partial video signals SP7 to SP12 corresponding to the captured video B of Frame 2. In Frames 3 to 5 subsequent to Frame 2, as illustrated in FIG. 10, the enable signal E2 has the logic level 0, which stops the operations of the video change detection units CR7e to CR12e. Thus, during this period, the 1F delay circuit Q2 of each of the video change detection units CR7e to CR12e holds the check value Cr based on each of the partial video signals SP7 to SP12 corresponding to the captured video B.

Then, in Frame 6 of FIG. 10, the video change detection units CR7e to CR12e are activated in accordance with the enable signal E2 with the logic level 1. As a result, in each of the video change detection unit CR7e to CR12e, the 1F delay circuit Q2 takes in the check value Cr based on each of the partial video signals SP7 to SP12 corresponding to the captured video of Frame 6, and the check value Cr is also supplied to the comparison circuit Q3. Furthermore, during this period, the check values Cr that have been held by the 1F delay circuit Q2 of the respective video change detection units CR7e to CR12e, which are based on the partial video signals SP7 to SP12 corresponding to the captured video B of Frame 2, are output from the 1F delay circuit Q2, and supplied to the comparison circuit Q3 as the delayed check values Crd. As illustrated in FIG. 10, the capture video of Frame 2 and the captured video of Frame 6 are both the captured video B. Thus, in Frame 6, the video change detection units CR7e to CR12e supply the video change detection signals C7 to C12 each indicating "no change" to the video sameness determination unit 212.

In the frame 3 of FIG. 10, for example, the video change detection units CR13e to CR18e of the third detection unit U3 are activated in accordance with the enable signal E3 with the logic level 1. As a result, in each of the video change detection unit CR13e to CR18e, the 1F delay circuit Q2 takes in the check value Cr based on each of the partial video signals SP13 to SP18 corresponding to the captured video C of Frame 3. In Frames 4 to 6 subsequent to Frame 3, as illustrated in FIG. 10, the enable signal E3 has the logic level 0, which stops the operations of the video change detection units CR13e to CR18e. Thus, during this period, the 1F delay circuit Q2 of each of the video change detection units CR13e to CR18e holds the check value Cr based on each of the partial video signals SP13 to SP18 corresponding to the captured video C.

Then, in the frame 7 of FIG. 10, the video change detection units CR13e to CR18e are activated in accordance with the enable signal E3 with the logic level 1. As a result, in each of the video change detection unit CR13e to CR18e, the 1F delay circuit Q2 takes in the check value Cr based on each of the partial video signals SP13 to SP18 corresponding to the captured video of Frame 7, and the check value Cr is also supplied to the comparison circuit Q3. Furthermore, during this period, the check values Cr that have been held by the 1F delay circuit Q2 of the respective video change detection units CR13e to CR18e, which are based on the partial video signals SP13 to SP18 corresponding to the captured video C of Frame 3, are output from the 1F delay circuit Q2, and supplied to the comparison circuit Q3 as the delayed check values Crd. As illustrated in FIG. 10, the capture video of Frame 3 and the captured video of Frame 7 are both the captured video C. Thus, in Frame 7, the video change detection units CR13e to CR18e supply the video change detection signals C13 to C18 each indicating "no change" to the video sameness determination unit 212.

In Frame 4 of FIG. 10, for example, the video change detection units CR19e to CR24e of the fourth detection unit U4 are activated in accordance with the enable signal E4 with the logic level 1. As a result, in each of the video change detection unit CR19e to CR24e, the 1F delay circuit Q2 takes in the check value Cr based on each of the partial video signals SP19 to SP24 corresponding to the captured video D of Frame 4. In Frames 5 to 7 subsequent to Frame 4, as illustrated in FIG. 10, the enable signal E4 has the logic level 0, which stops the operations of the video change detection units CR19e to CR24e. Thus, during this period, the 1F delay circuit Q2 of each of the video change detection units CR19e to CR24e holds the check value Cr based on each of the partial video signals SP19 to SP24 corresponding to the captured video D.

Then, in Frame 8 of FIG. 10, the video change detection units CR19e to CR24e are activated in accordance with the enable signal E4 with the logic level 1. As a result, in each of the video change detection unit CR19e to CR24e, the 1F delay circuit Q2 takes in the check value Cr based on each of the partial video signals SP19 to SP24 corresponding to the captured video of Frame 8, and the check value Cr is also supplied to the comparison circuit Q3. Furthermore, during this period, the check values Cr that have been held by the 1F delay circuit Q2 of the respective video change detection units CR19e to CR24e, which are based on the partial video signals SP19 to SP24 corresponding to the captured video D of Frame 4, are output from the 1F delay circuit Q2, and supplied to the comparison circuit Q3 as the delayed check values Crd. As illustrated in FIG. 10, the capture video of Frame 4 and the captured video of Frame 8 are both the captured video D. Thus, in Frame 8, the video change detection units CR19e to CR24e supply the video change detection signals C19 to C24 each indicating "no change" to the video sameness determination unit 212.

As a result, the video sameness determination unit 212 and the continuation determination unit 213 can output the freeze detection signal FS indicating whether or not the periodic freeze is occurring in which four captured videos having differing contents for each frame appear in order repeatedly in a cycle of four frames, based on the video change detection signals C1 to C24

In the embodiment described above, a change in video between two frames is detected by performing the CRC calculation on the partial video signals, but other processes than the CRC calculation may be applied.

In summary, the video change detection unit CR may have any configurations as long as it determines, for each of the first to k-th partial video signals (SP), whether or not there is a change between a video of one frame based on the partial video signal and a video of a subsequent frame that is apart from that one frame by a prescribed number of frames, and generates the respective detection results as the first to k-th video change detection signals (C).

In the embodiment described above, the operation of the 1F delay circuit Q2 to take in the check values is controlled by the control unit CT, but it is also possible to eliminate the control unit CT and add the function of the control unit CT to the 1F delay circuit Q2.

That is, the video change detection units CR each include the CRC calculation circuit, one of the first to k-th delay circuits, and the comparison circuit described below. The CRC calculation circuit performs the CRC (cyclic Redundancy Check) calculation on one of the first to k-th partial video signals to generate one of the first to k-th check values (Cr). The first to K-th delay circuits (Q2) take in and hold the first to k-th check values at a cycle of a prescribed number of frames, and output the first to k-th check values that have been held as the delay check values (Crd). The comparison circuit (Q3) respectively determine whether the first to k-th check value are the same as the first to k-th delay check values, and generate the k-number of signals indicating the determination results respectively, as the first to k-th video change detection signal (C).

The periodic freeze described above includes, not only the case described above where the first to fourth captured videos having differing contents for each frame repeatedly appear in order, but also a case in which the captured videos appear randomly (referred to herein as random freeze).

Figure 11A:
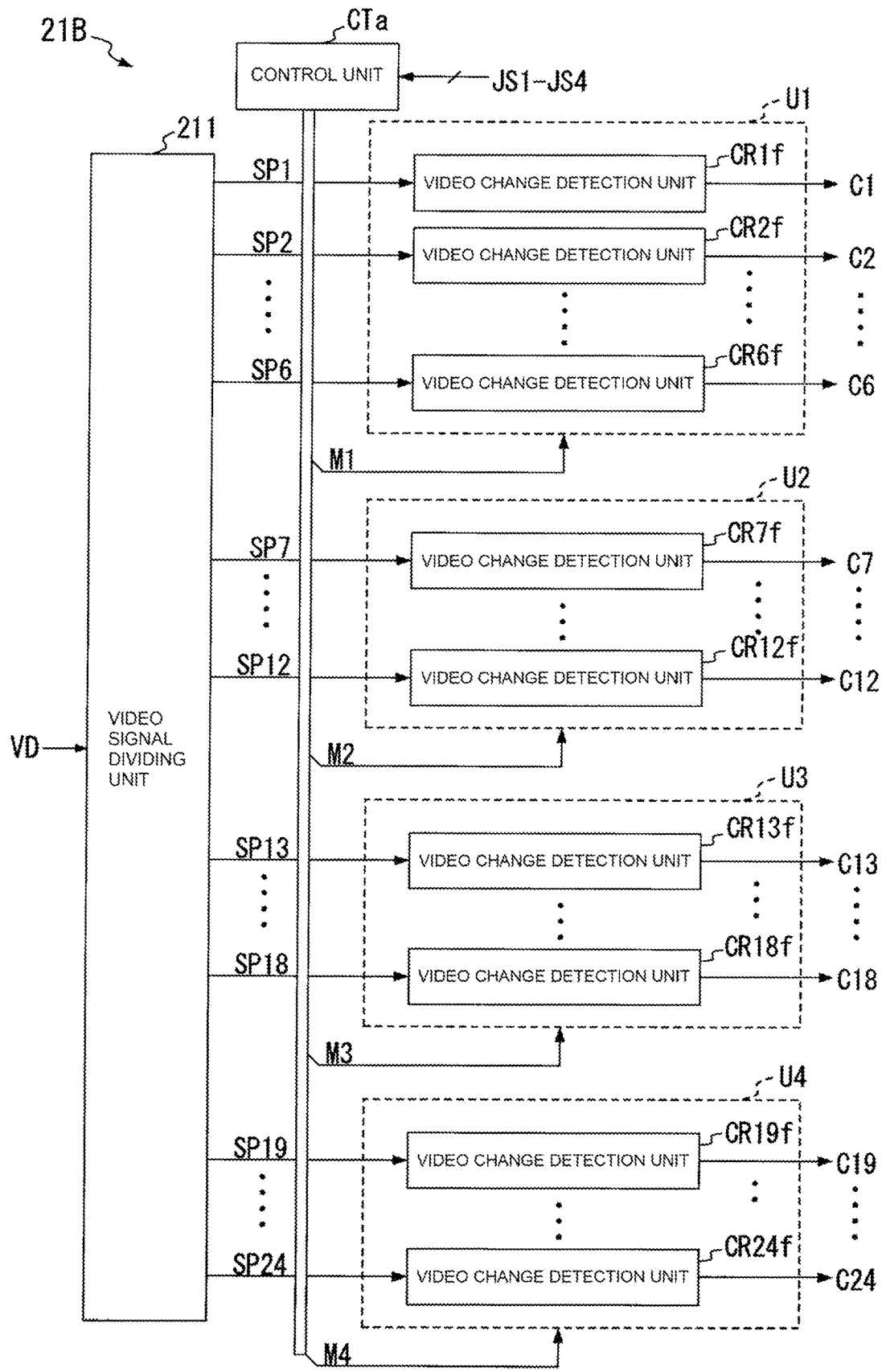
FIG. 11A is a block diagram showing an example of the internal configuration of the video freeze detection circuit 21B that can detect random freezing.
Figure 11B:
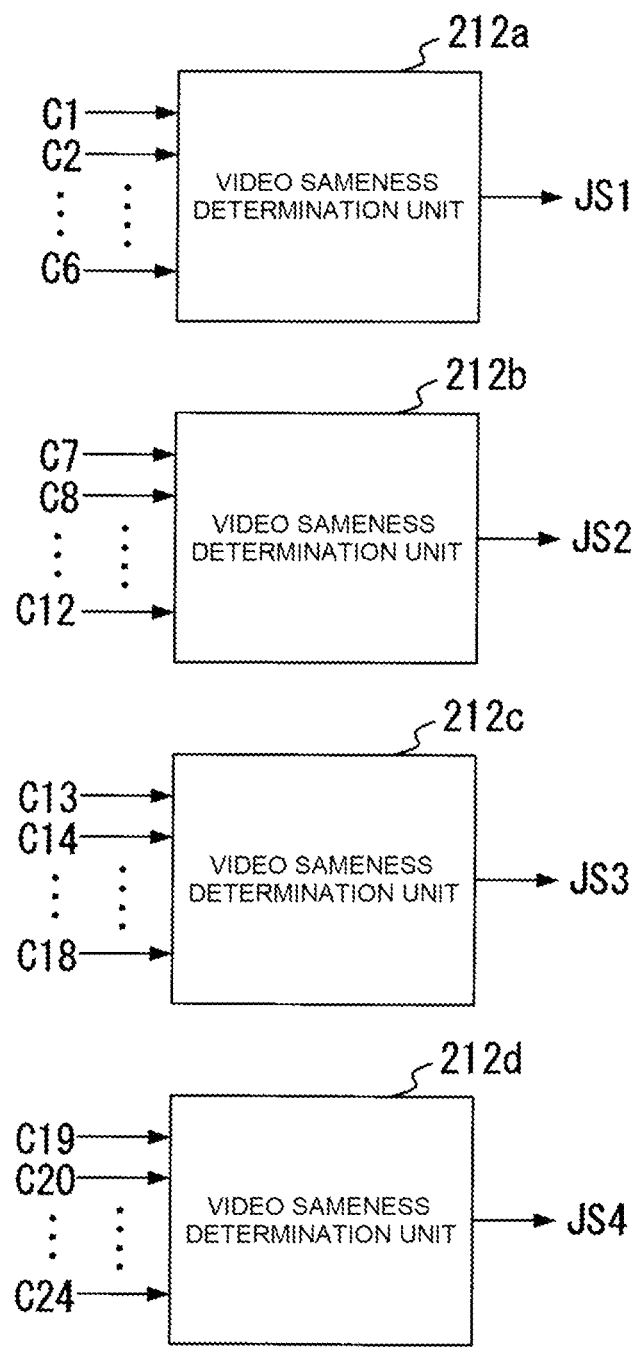
FIG. 11B is a block diagram showing an example of the internal configuration of the video freeze detection circuit 21B that can detect random freezing.
Figure 11C:
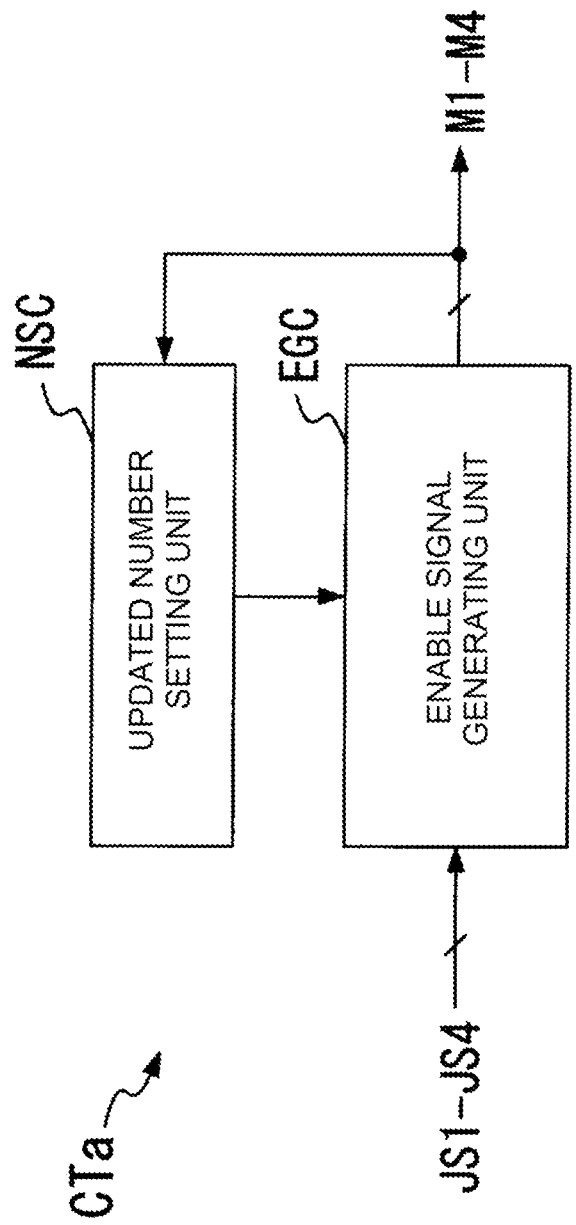
FIG. 11C is a block diagram showing the internal configuration of a control unit CTa.

FIGS. 11A to 11C are block diagrams showing the internal configuration of the video freeze detection circuit 21B that can detect the random freeze.

The video freeze detection circuit 21B is equipped with a control unit CTa instead of the control unit CT, and video change detection units CR1f to CR24f instead of the video change detection units CR1e to CR24e. Furthermore, the video freeze detection circuit 21B is equipped with the video sameness determination units 212a to 212d illustrated in FIG. 11B, instead of the video sameness determination unit 212, but other configurations are the same as those of the video freeze detection circuit 21A of FIG. 9.

Each of the video change detection units CR1f to CR24f has the CRC calculation circuit Q1, the 1F delay circuit Q2, and the comparison circuit Q3 shown in FIG. 3, similarly to each of the video change detection units CR1e to CR24e.

However, in each of the video change detection units CR1f and CR24f, only the 1F delay circuit Q2, out of the CRC calculation circuit Q1, the 1F delay circuit Q2, and the comparison circuit Q3, is controlled by the enable signal. That is, the 1F delay circuit Q2 takes in and holds the check value Cr, and outputs the check value Cr as the delayed check value Crd while receiving the enable signal of the logic level 1 indicating the enable state. On the other hand, when receiving the enable signal of the logic level 0 indicating the disable state, the 1F delay circuit Q2 stops taking in the check value Cr, or in other words, stops updating the check value Cr, and continues to output the delayed check value Crd that is held at that point.

The video sameness determination unit 212a determines that the video based on the partial video signals SP1 to SP6 has not changed if the number of video change detection signals indicating "no change," out of the video change detection signals C1 to C6 supplied from the video change detection units CR1f to CR6f, is greater than a prescribed number, and supplies a video sameness signal JS1 indicating that fact to the control unit CTa.

The video sameness determination unit 212b determines that the video based on the partial video signals S7 to SP12 has not changed if the number of video change detection signals indicating "no change," out of the video change detection signals C7 to C12 supplied from the video change detection units CR7f to CR12f, is greater than a prescribed number, and supplies a video sameness signal JS2 indicating that fact to the control unit CTa.

The video sameness determination unit 212c determines that the video based on the partial video signals S13 to SP18 has not changed if the number of video change detection signals indicating "no change," out of the video change detection signals C13 to C18 supplied from the video change detection units CR8f to CR13f, is greater than a prescribed number, and supplies a video sameness signal JS3 indicating that fact to the control unit CTa.

The video sameness determination unit 212d determines that the video based on the partial video signals S19 to SP24 has not changed if the number of video change detection signals indicating "no change," out of the video change detection signals C19 to C24 supplied from the video change detection units CR19f to CR24f, is greater than a prescribed number, and supplies a video sameness signal JS4 indicating that fact to the control unit CTa.

Figure 12:
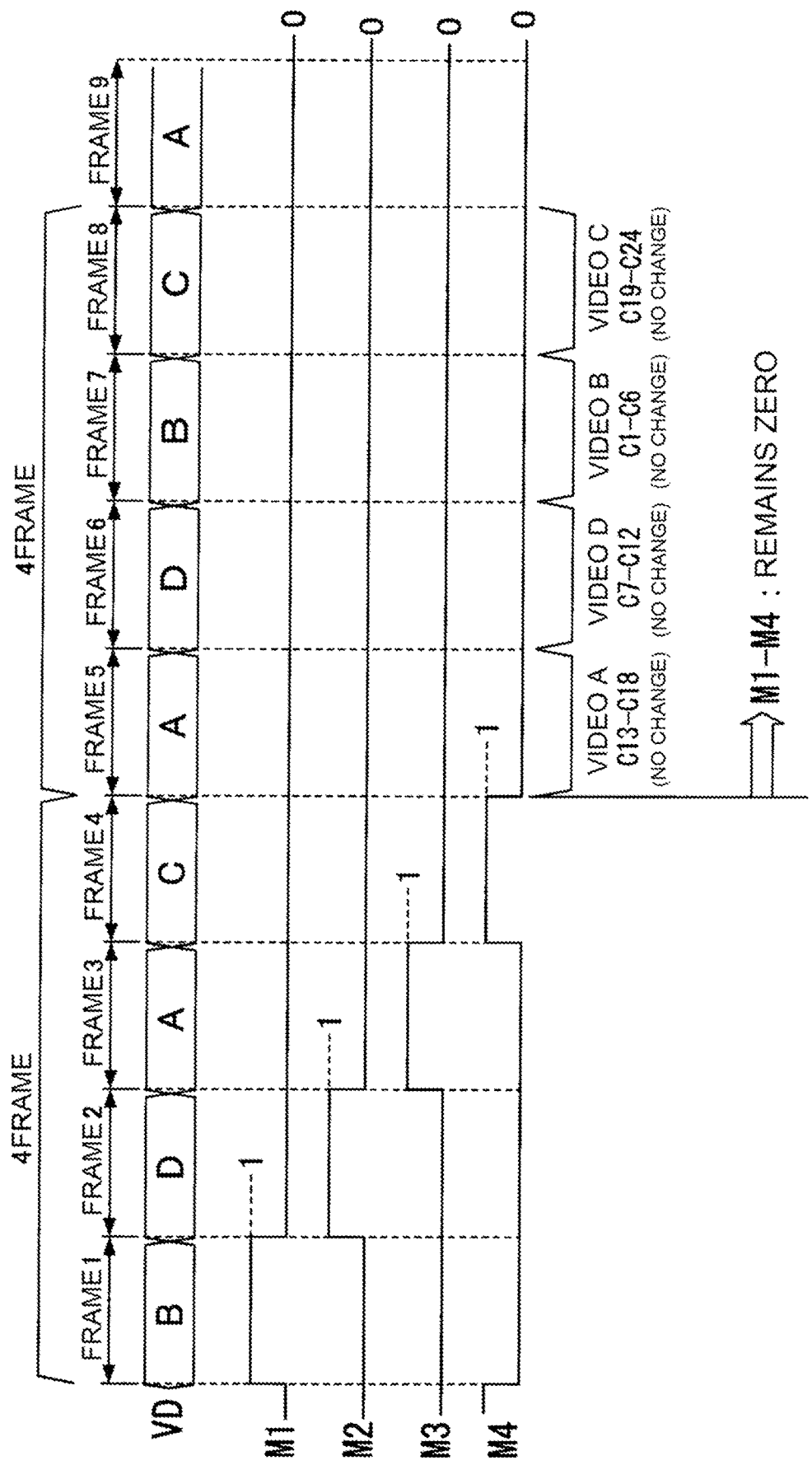
FIG. 12 is a time chart showing an example of the captured video signal VD having the random freezing and enable signals E1 to E4.

The control unit CTa generates enable signals M1 to M4 illustrated in FIG. 12, for example, based on the video sameness signal JS synchronously with the respective frames of the captured video signal VD.

FIG. 11C is a block diagram illustrating the internal configuration of the control unit CTa.

In FIG. 11C, a updated number setting unit NSC identifies the number of an enable signal, out of the enable signals M1 to M4, that has changed from the logic level 0 to the logic level 1, which indicates the enable state, as the previous update number that is the number of the enable signal used to update the partial video signals last time. The updated number setting unit NSC supplies this previous update number to the enable signal generating unit EGC.

When receiving one of the video sameness signal JS1 to JS4, the enable signal generating unit EGC generates the enable signals M1 to M4 of the logic level 0 indicating the disabled state.

The enable signal generating unit EGC adds 1 to the previous update number supplied from the updated number setting unit NSC to find a possible enable signal number "n" that indicates the number of the enable signal that can be changed to the enabled state next.

If none of the video sameness signals JS1 to JS4 is received, or in other words, if the captured video signal has changed, the enable signal generating unit EGC generates the enable signals M1 to M4 by setting one enable signal Mn identified with the possible enable signal number n, out of the enable signals M1 to M4, to the logic level 1, and setting other enable signals M to the logic level 0.

As described above, each of the first to fourth delay circuit groups obtained by grouping 24 delay circuits Q2a of the video change detection units CR1f to CR24f into four groups (U1 to U4), respectively, is controlled by the control unit CTa to take in the check values Cr at a different frame in a series of frames, or in other words, at a timing in which the enable signals M1 to M4 have the logic level 1. However, if some of the partial video signals SP1 to SP24 indicate that the video has "not changed," the control unit CTa stops the respective delay circuits Q2a from taking in the check value Cr. Then when the partial video signals SP1 to SP24 all indicate that the video has changed, the control unit CTa restarts the operation to take in the check values Cr from the frame that comes after the frame immediately preceding the point where the operation is paused among the consecutive frames.

That is, the control unit CTa generates the enable signals M1 to M4 such that one of the enable signals M1 to M4 is changed to the logic level 1 indicating the enabled state in one frame of the captured video signal VD, and during that frame, the other three of the enable signals M1 to M4 are set to the logic level 0 that indicates the disabled state.

That is, the control unit CTa stops the operation to take in the check values Cr, which is performed by the delay circuit Q2 in each of the video change detection units Cr1f to CR24f, based on the video sameness signal indicating that the video signal has not changed.

On the other hand, when the video sameness signals JS1 to JS4 are supplied, the control unit CTa sets all of the enable signals M1 to M4 to the logic level 0 indicating the disabled state.

Below, the operation of the video freeze detection circuit 21 to detect the random freeze will be explained, using the captured video signal VD of FIG. 12, as an example. FIG. 12 illustrates the random freeze where the captured videos A to D having differing content appear randomly in the respective frames.

First, during the period from Frame 1 to Frame 4 of FIG. 12, the captured videos B, D, C, and A having differing content appear in the captured video signal VD. At a timing immediately before Frame 1, the video change detection signals C1 to C24 all indicate that the video has "changed." During the period from Frame 1 to Frame 4, the captured videos A to D having contents differing from each other appear in the captured video signal VD in the respective frames, and therefore, all of the video change detection signals C1 to C24 indicate that the video has "changed."

Thus, based on the video change detection signals C1 to C24 indicating the video has "changed," the control unit CTa supplies, to the detection circuits U1 to U4, the enable signals M1 to M4 that are changed to the logic level 1 one by one in order from Frame 1 to Frame 4.

As a result, first, in Frame 1, the check value Cr based on the captured video B is taken in and held by the 1F delay circuit Q2 of each of the video change detection units Cr1f to Cr6f in accordance with the enable signal M1 of the logic level 1.

In Frame 2 that immediately follows Frame 1, the check value Cr based on the captured video D is taken in and held by the 1F delay circuit Q2 of each of the video change detection units Cr7f to Cr12f in accordance with the enable signal M2 of the logic level 1.

In Frame 3 that immediately follows Frame 2, the check value Cr based on the captured video A is taken in and held by the 1F delay circuit Q2 of each of the video change detection units Cr13f to Cr18f in accordance with the enable signal M3 of the logic level 1.

In Frame 4 that immediately follows Frame 3, the check value Cr based on the captured video C is taken in and held by the 1F delay circuit Q2 of each of the video change detection units Cr19f to Cr24f in accordance with the enable signal M4 of the logic level 1.

Here, in Frames 2 to 4, the comparison circuit Q3 of each of the video change detection units CR1f to CR6f compares the delayed check value Crd based on the captured video B that has been held in the 1F delay circuit Q2 with the check value Cr based on each of the captured videos D, A, and C that appear in Frames 2 to 4, in this order, respectively.

In Frames 3 and 4, the comparison circuit Q3 of each of the video change detection units CR7f to CR12f compares the delayed check value Crd based on the captured video D that has been held in the 1F delay circuit Q2 with the check value Cr based on each of the captured videos A and C that appear in Frames 3 and 4 in this order, respectively.

In Frame 4, the comparison circuit Q3 of each of the video change detection units CR13f to CR18f compares the delayed check value Crd based on the captured video A that has been held in the 1F delay circuit Q2 with the check value Cr based on the captured video C that appears in Frame 4. Because the captured videos A to D that appear in Frames 1 to 4 have contents differing from each other, the video change detection units Cr1f to CR24f output the video change detection signals C1 to C24 that indicate that the video has "changed."

In Frame 5 that immediately follows Frame 4, the respective check values Cr based on the captured video A are supplied to the comparison circuit Q3 of the video change detection units CR1f to CR24f, respectively. At this time, the 1F delay circuit Q2 of each of the video change detection units CR13f to CR18f have held therein the check value Cr based on the captured video A of Frame 3, and the delayed check value Crd corresponding to this check value Cr is supplied to the comparison circuit Q3. Thus, because the captured video A of Frame 3 and the captured video A of Frame 5 are the same, the comparison circuit Q3 of each of the video change detection units CR13*f* to CR18*f* outputs the video change detection signals C13 to C18 indicating that the video has "not changed."

Therefore, by the video change detection signals C13 to C18 indicating that the video has "not changed," the control unit CTa sets the enable signals M1 to M4 to the logic level 0 so that the 1F delay circuit Q2 of each of the video change detection units CR1*f* to CR24*f* stops taking in the check value Cr in Frame 5.

In Frame 6 that immediately follows Frame 5, the 1F delay circuit Q2 of each of the video change detection units CR7*f* to CR12*f* have held therein the check value Cr based on the captured video D of Frame 2, and the delayed check value Crd corresponding to this check value Cr is supplied to the comparison circuit Q3. In Frame 6, the respective check values Cr based on the captured video D that was represented by the captured video signal VD are supplied to the comparison circuit Q3 of the video change detection units CR1*f* to CR24*f*, respectively. Thus, because the captured video D of Frame 2 and the captured video D of Frame 6 are the same, the comparison circuit Q3 of each of the video change detection units CR7*f* to CR12*f* outputs the video change detection signals C7 to C12 indicating that the video has "not changed."

In Frame 7 that immediately follows Frame 6, the 1F delay circuit Q2 of each of the video change detection units CR1*f* to CR6*f* have held therein the check value Cr based on the captured video B of Frame 1, and the delayed check value Crd corresponding to this check value Cr is supplied to the comparison circuit Q3. In Frame 7, the respective check values Cr based on the captured video B that was represented by the captured video signal VD are supplied to the comparison circuit Q3 of the video change detection units CR1*f* to CR24*f*, respectively. Thus, because the captured video B of Frame 1 and the captured video B of Frame 7 are the same, the comparison circuit Q3 of each of the video change detection units CR1*f* to CR6*f* outputs the video change detection signals C1 to C6 indicating that the video has "not changed."

In Frame 8 that immediately follows Frame 7, the 1F delay circuit Q2 of each of the video change detection units CR19*f* to CR24*f* has held therein the check value Cr based on the captured video C of Frame 4, and the delayed check value Crd corresponding to this check value Cr is supplied to the comparison circuit Q3. In Frame 8, the respective check values Cr based on the captured video C that was represented by the captured video signal VD are supplied to the comparison circuit Q3 of the video change detection units CR1*f* to CR24*f*, respectively. Thus, because the captured video C of Frame 4 and the captured video C of Frame 8 are the same, the comparison circuit Q3 of each of the video change detection units CR19*f* to CR24*f* outputs the video change detection signals C19 to C24 indicating that the video has "not changed."

With the video change detection signals C1 to C24 described above, the video sameness determination unit and the continuation determination unit 213 can generate the freeze detection signal FS that indicates whether or not the random freeze is occurring in the captured video signal VD.

Figure 13:
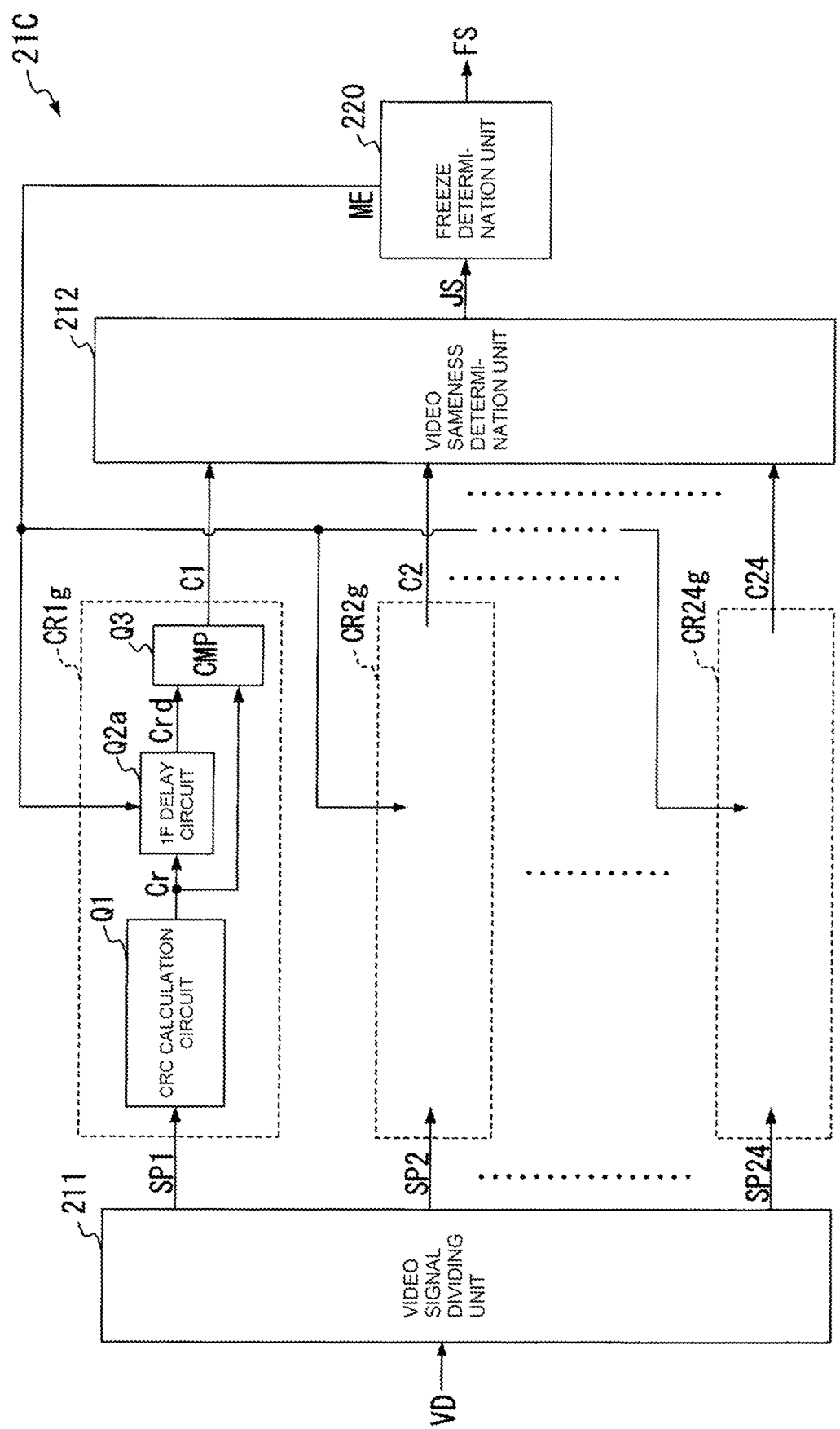
FIG. 13 is a block diagram showing an example of the internal configuration of the video freeze detection circuit 21C, which is another embodiment that can detect random freezing.

FIG. 13 is a block diagram showing the internal configuration of a video freeze detection circuit 21C, which is another example of the video freeze detection circuit that can detect this random freeze. The video freeze detection circuit 21C has the same configuration as that of FIG. 3 except that the video change detection units CR1 to CR24 are replaced with video change detection units CR1*g* to CR24*g*, and the continuation determination unit 213 is replaced with a freeze determination unit 220.

Also, the video change determination units CR1*g* to CR24*g* each have the same internal configuration as that of FIG. 3 except that the 1F delay circuit Q2 is replaced with a 1F delay circuit Q2*a*.

The 1F delay circuit Q2*a* is constituted of a buffer memory that takes in and holds the check value Cr supplied from the CRC calculation circuit Q1 while the enable signal of the logic level 1 is supplied, and output this value as the delay check value Crd after one frame period has passed. On the other hand, the 1F delay circuit Q2*a* stops taking in the check value Cr while the enable signal of the logic level 0 is supplied, and outputs the check value Cr that has been held as the delay check value Crd.

The freeze determination unit 220 outputs a freeze detection signal FS indicating whether or not the captured video signal VD is frozen based on the video sameness signal JS supplied from the video sameness determination unit 212, in a manner similar to the continuation determination unit 213.

Then the freeze determination unit 220 generates the enable signal ME that switches between the logic level 1 indicating the enabled state and the logic level 0 indicating the disabled state, based on the video sameness signal JS, and supplies the signal to the 1F delay circuit Q2*a* of each of the video change detection units CR1*g* to CR24*g*.

Figure 14:
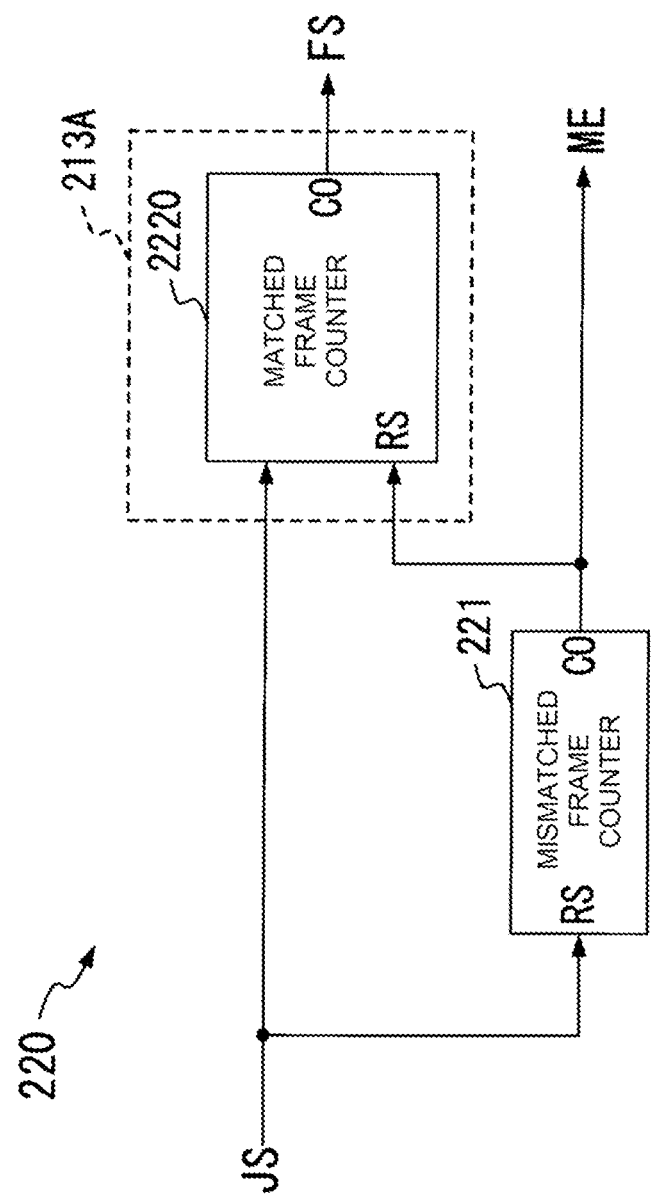
FIG. 14 is a block diagram showing the internal configuration of a freeze determination unit 220.

FIG. 14 is a block diagram illustrating the internal configuration of a freeze determination unit 220.

As illustrated in FIG. 14, the freeze determination unit 220 includes a mismatched frame counter 221 and a continuation determination unit 213A.

The mismatched frame counter 221 counts up the number of frames of the captured video signal VD when the video sameness signal JS is not supplied, or in other words, when the video of one frame does not match the video of the next frame. Until the counter value reaches a prescribed count value, i.e., the first count value, the mismatched frame counter 221 generates the enable signal ME of the logic level 0 indicating the disabled state. Thereafter, when the counter value reaches the first count value, the mismatched counter 221 changes the enable signal ME from the logic level 0 to the logic level 1 indicating the enabled state, and resets the counter value to zero.

The mismatched frame counter 221 supplies the enable signal ME to the continuation determination unit 213A and the 1F delay circuit Q2*a* of each of the video change detection units CR1*g* to CR24*g*.

The continuation determination unit 213A is constituted of a matched frame counter 2220 illustrated in FIG. 14, for example.

The matched frame counter 2220 counts up the number of frames when the video sameness signal JS is supplied, or in other words, when the video of one frame matches the video of the next frame. When the enable signal ME of the logic level 1 is supplied from the mismatched frame counter 221, the matched frame counter 2220 resets the count value to zero.

The matched frame counter 2220 outputs the freeze detection signal FS of the logic level 0, for example, indicating that the captured video signal VD is not frozen, until the counter value thereof reaches a prescribed count value, i.e. the second count value. When the counter value reaches the second count value, the matched frame counter 2220 outputs the freeze detection signal FS of the logic level 1, for example, indicating that the captured video signal VD is frozen.

Next, the operation of the freeze determination unit 220 to detect the random periodic freeze will be explained with reference to the time chart of FIG. 15 where the first counter value is 12 and the second counter value is 3.

Figure 15:
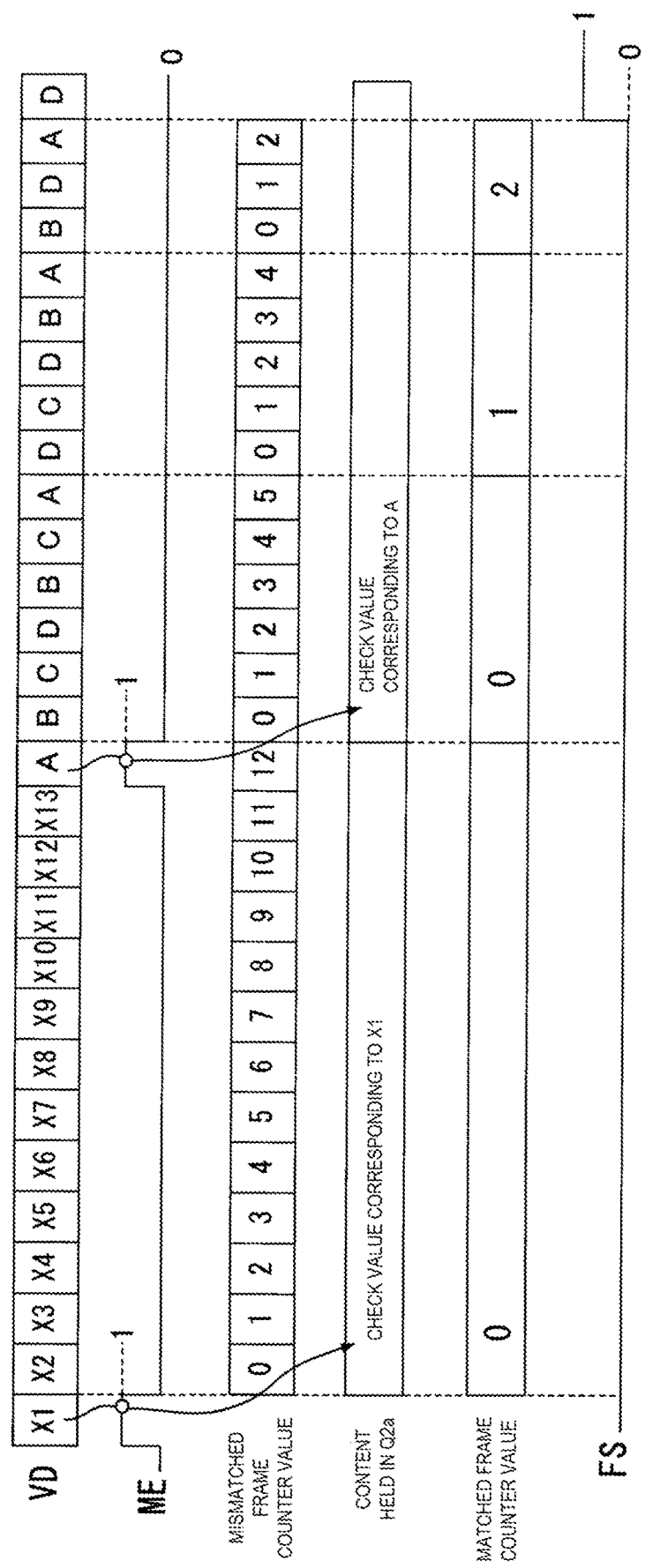
FIG. 15 is a time chart showing an example of the captured video signal VD having the random freezing and the operation of the freeze determination unit 220.

In the time chart of FIG. 15, videos X1 to X13 having content differing from each other successively appear in this order in the captured video signal VD, and then the videos A to D having content differing from each other in each frame randomly appear in a cycle of four frames.

In the time chart of FIG. 15, in the frame of the video X1, the check value based on the video X1 is held in the 1F delay circuit Q2a in accordance with the enable signal ME of the logic level 1.

Thereafter, the videos X2 to X13 that do not match the content of the video X1 successively appear, and therefore, the mismatched frame counter 221 increases the counter value by one for each frame. During this period, the enable signal ME continues to have the logic level 0, and therefore, the content of the 1F delay circuit Q2a is not updated. This means that the 1F delay circuit Q2a continues to hold the check value based on the video X1.

When the video A appears in the captured video signal VD in the frame following the video X13, and the counter value of the mismatched frame counter 221 reaches "12," which is the first counter value, the enable signal ME changes from the logic level 0 to the logic level 1. As a result, the 1F delay circuit Q2a takes in and holds the check value based on the video A. Also, as a result of the enable signal ME changing to the logic level 1, the counter value of the mismatched frame counter 221 is reset to zero. Then the mismatched frame counter 221 increases the counter value by 1 for each frame until the video sameness signal JS is received or until the video A appears again in the captured video signal VD. When the counter value of the mismatched frame counter 221 is reset to zero, the enable signal ME is changed from the logic level 1 to the logic level 0, and remains in this state until the counter value of the mismatched frame counter 221 reaches "12."

In the embodiment illustrated in FIG. 15, the video A appears in the captured video signal VD in the frame that comes after the respective frames where the videos B, C, D, B, C appear in this order, or in other words, in the frame where the counter value of the mismatched frame counter 221 is "5." As a result, the video sameness signal JS is supplied, and the counter value of the mismatched frame counter 221 is reset to zero. Because the video sameness signal JS is supplied in this frame, the matched frame counter 2220 increases the counter value to "1."

Then, the video A appears again in the captured video signal VD in the frame that comes after the videos D, C, D, B appear in this order, or in other words, in the frame where the counter value of the mismatched frame counter 221 is "4." As a result, the video sameness signal JS is supplied, and the counter value of the mismatched frame counter 221 is reset to zero. In this frame, the counter value of the matched frame counter 2220 is increased by one and becomes "2."

Then, the video A appears again in the captured video signal VD in the frame that comes after the videos B and D appear in this order, or in other words, in the frame where the counter value of the mismatched frame counter 221 is "2." As a result, the video sameness signal JS is supplied, and the counter value of the mismatched frame counter 221 is reset to zero. In this frame, the counter value of the matched frame counter 2220 is increased by one to "3."

At this point, the matched frame counter 2220 outputs the freeze detection signal FS of the logic level 1 indicating that the random freeze is occurring as a result of the counter value being "3," which is the second counter value.

As described above, the video freeze detection circuit 21C updates the content of the 1F delay circuit 2a of each of the video change detection units CR1g to CR24g only when the same video as the video in one frame does not appear in a subsequent frame that is apart from that one frame by the first prescribed number (in FIG. 15, the first prescribed number is "13" obtained by adding one to the first counter value "12"). If a phenomenon in which the same video as the video corresponding to the check value held in the 1F delay circuit Q2a appears in the captured video signal VD within a prescribed number of successive frames is repeated for the second prescribed number of times (in FIG. 3, this second prescribed number is the second counter value "3"), the video freeze detection circuit 21C outputs the freeze detection signal FS indicating that the random freeze is occurring.

With the video freeze detection circuit 21C, it is possible to detect the random freeze with a configuration smaller than the video freeze detection circuit 21B.

The configurations and operations of the video freeze detection circuit 21C, the mismatch frame counter 221, and the continuation determination unit 213A are not limited to the configurations and operations described above.

In summary, the video freeze detection circuit 21C may have any configurations as long as it has the CRC calculation circuits, first to k-th delay circuits, comparison circuit, and freeze determination units described below.

That is, the CRC calculation circuits perform the CRC (cyclic Redundancy Check) calculation on the first to k-th partial video signals respectively to generate the first to k-th check values (Cr). The first to K-th delay circuits (Q2a) respectively take in and hold the first to k-th check values in accordance with the enable signal (ME) indicating the enabled state, and output the first to k-th check values that have been held as the delay check values (Crd). The comparison circuits (Q3) respectively determine whether the first to k-th check values are the same as corresponding ones of the first to k-th delay check values, and generate the k-number of signals indicating the determination results individually, as the first to k-th video change detection signals (C).

The freeze determination unit (220) includes a mismatched frame counter and a continuation determination unit.

The mismatch frame counter (221) counts the number of frames in the video signal when the video sameness signal (JS) is not supplied, and supplies the enable signal (ME) indicating the enabled state to the first to k-th delay circuits when the counter value reaches a prescribed number M (M is an integer of 2 or greater). When receiving the video sameness signal, the mismatch frame counter resets the counter value to an initial value (zero, for example).

The continuation determination unit (213A) generates the freeze detection signal (FS) that indicates that the video is frozen when a phenomenon in which the video sameness signal is supplied at least once during the M-frame period continues to occur for a prescribed number of times in the subsequent frame groups.

With this configuration, the freeze determination unit generates a freeze detection signal indicating whether or not the random freeze, in which a plurality of frames having video contents differing from each other appear randomly at a cycle of the plurality of frames is occurring in the video signals.

What is claimed is:

1. A video signal processing device, comprising:
a video signal dividing unit configured to receive a video signal constituted of a series of frames, and divide the video signal into first to k-th (k is an integer of 2 or greater) partial video signals for respective frames;
a video change detection unit configured to determine, for each of the first to k-th partial video signals, whether or not a video based on the partial video signals has changed between respective frames, and generate first to k-th video change detection signals representing respective detection results;
a video sameness determination unit configured to generate a video sameness signal indicating that the video has not changed, if a number of video change detection signals that indicate the video based on the partial video signals has not changed, among the first to k-th video change detection signals, is greater than a prescribed number; and
a freeze determination unit configured to, based on the video sameness signal, output a freeze detection signal indicating whether or not the captured video signal VD is frozen;
wherein the freeze determination unit is further configured to output an enable signal, based on the video sameness signal, to first to k-th delay circuits that take in and hold first to k-th check values in a cycle of a prescribed number of frames, the first to k-th check values corresponding to a CRC (cyclic redundancy check).

2. The video signal processing device according to claim 1, further comprising a continuation determination unit configured to output a freeze detection signal that indicates the video signal is frozen when the video sameness signal continues over M frames (M is an integer of 2 or greater).

3. The video signal processing device according to claim 1, wherein the video signal includes a plurality of pixel data pieces having a plurality of bits each representing a luminance level of each pixel for each frame, and
wherein the video signal dividing unit generates the first to k-th partial video signals by dividing, into a plurality of bit groups, each of a plurality of the pixel data pieces that are used for image display in each of partial image areas obtained by dividing an image area for one frame based on the video signal into a plurality of areas, and grouping together bit groups from a plurality of the pixel data pieces differing from each other to obtain first to k-th groups, and grouping together groups among the first to k-th groups.

4. The video signal processing device according to claim 1, wherein the video signal dividing unit divides an image area for one frame based on the video signal into k-number of partial image areas, and groups together a plurality of pixel data pieces used for image display in the k-number of partial image areas into the first to k-th partial video signals, respectively.

5. The video signal processing device according to claim 1, wherein the video change detection unit determines, for each of the first to k-th partial video signals, whether or not there is a change between a video based on the partial video signals in one frame and a video in a subsequent frame that is apart from said one frame by a prescribed number of frames, and generates the respective detection results as the first to k-th video change detection signals.

6. The video signal processing device according to claim 5, wherein the video change detection unit includes: a CRC (cyclic redundancy check) calculation circuit that performs CRC calculation on the first to k-th partial video signals respectively to calculate the first to k-th check values; the first to k-th delay circuits that take in and hold the first to k-th check values in the cycle of the prescribed number of frames, and output, as first to k-th delayed check values, the first to k-th check values that have been held; and a comparison circuit that compares each of the first to k-th check values with corresponding ones of the first to k-th delayed check values to determine whether the compared values are the same or not and that generates k-number of signals respectively indicating the detection results as the first to k-th video change detection signals.

7. The video signal processing device according to claim 6, wherein the prescribed number is j (j is an integer equal to or greater than 2 and smaller than k),
wherein the video signal processing device further comprises a control unit configured to cause each of first to j-th delay circuit groups obtained by dividing the first to k-th delay circuits into j-number of groups to take in the check values at different timings corresponding to different frames among the series of frames, and
wherein the control unit is configured to, when part of the first to k-th partial video signals indicates that the video has not changed, stop an operation of the first to k-th delay circuit groups to take in the check values, and when the first to k-th partial video signals are changed to indicate that the video has changed, resume the operation to take in the check values from a frame that follows a frame immediately preceding a point at which the operation was stopped.

8. The video signal processing device according to claim 1, wherein the freeze determination unit is configured to generate the freeze detection signal indicating whether or not the video signal is frozen in such a manner that a plurality of frames having video contents differing from each other appear randomly at a cycle of the plurality of frames,
wherein the video change detection unit includes: a CRC (cyclic redundancy check) calculation circuit that performs CRC calculation on the first to k-th partial video signals individually to calculate the first to k-th check values; the first to k-th delay circuits that take in and hold the first to k-th check values in accordance with the enable signal indicating an enabled state, and that output, as first to k-th delayed check values, the first to k-th check values that have been held; and a comparison circuit that compares each of the first to k-th check values with corresponding ones of the first to k-th delayed check values to determine whether the compared values are the same or not, and that generates k-number of signals respectively indicating the detection results as the first to k-th video change detection signals,
wherein the video sameness determination unit supplies the video sameness signal to the freeze determination unit if the video sameness signal is generated, and
wherein the freeze determination unit includes: a mismatched frame counter configured to count a number of frames in the video signal when the video sameness signal is not received, and supply the enable signal indicating the enabled state to the first to k-th delay circuits when a counter value reaches a prescribed number of M frames (M is an integer of 2 or greater), the mismatched frame counter resetting the counter value when the video sameness signal is received; and a continuation determination unit configured to generate, as the freeze detection signal, a signal indicating that the video is frozen if an event in which the video sameness signal is supplied repeatedly for a prescribed number of times in a subsequent frame group occurs at least once during an M frame period.

* * * * *